US012604360B2

(12) United States Patent
Jung

(10) Patent No.: US 12,604,360 B2
(45) Date of Patent: Apr. 14, 2026

(54) METHOD AND DEVICE FOR MANAGING LONG-TIME SWITCHING TIMER IN WIRELESS COMMUNICATION SYSTEM

(71) Applicant: Samsung Electronics Co., Ltd., Gyeonggi-do (KR)

(72) Inventor: Sangyeob Jung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 285 days.

(21) Appl. No.: 18/550,310

(22) PCT Filed: Mar. 24, 2022

(86) PCT No.: PCT/KR2022/004146
§ 371 (c)(1),
(2) Date: Sep. 13, 2023

(87) PCT Pub. No.: WO2022/203426
PCT Pub. Date: Sep. 29, 2022

(65) Prior Publication Data
US 2024/0188174 A1    Jun. 6, 2024

(30) Foreign Application Priority Data

Mar. 26, 2021    (KR) ........................ 10-2021-0039678

(51) Int. Cl.
*H04W 76/27*        (2018.01)
*H04W 76/30*        (2018.01)
(Continued)

(52) U.S. Cl.
CPC ........... *H04W 76/27* (2018.02); *H04W 76/30* (2018.02); *H04W 76/38* (2018.02); *H04W 88/06* (2013.01)

(58) Field of Classification Search
CPC ..... H04W 76/27; H04W 76/38; H04W 88/06; H04W 76/19; H04W 76/30; H04L 69/28
See application file for complete search history.

(56) References Cited

U.S. PATENT DOCUMENTS

2020/0336891 A1    10/2020    Guo et al.
2021/0014934 A1    1/2021    Lovlekar et al.
(Continued)

FOREIGN PATENT DOCUMENTS

KR    10-2021-0020384    2/2021
WO    WO 2020/247043    12/2020
WO    WO 2021/029580    2/2021

OTHER PUBLICATIONS

PCT/ISA/210, International Search Report dated Jul. 4, 2022 issued in counterpart application No. PCT/KR2022/004146, 5 pages.
(Continued)

*Primary Examiner* — Michael K Phillips
(74) *Attorney, Agent, or Firm* — The Farrell Law Firm, P.C.

(57) ABSTRACT

The present disclosure relates to a $5^{th}$ generation (5G) or $6^{th}$ generation (6G) communication system for supporting a higher data rate. Provided is a method performed by a user equipment (UE) in a wireless communication system. The method may include: receiving, from a base station (BS), configuration information associated with the UE to leave a radio resource control (RRC) connection state for a multi-universal subscriber identity module (MUSIM) operation; based on the configuration information, transmitting, to the BS, information indicating a preferred RRC state when the UE leaves the RRC connection state, and starting a timer; and transitioning to an RRC idle state when the timer expires.

20 Claims, 16 Drawing Sheets

(51) Int. Cl.
   H04W 76/38      (2018.01)
   H04W 88/06      (2009.01)

(56)                  References Cited

U.S. PATENT DOCUMENTS

| | | | |
|---|---|---|---|
| 2022/0210632 A1* | 6/2022 | Tseng | H04W 8/183 |
| 2023/0047213 A1* | 2/2023 | Chen | H04W 60/005 |
| 2023/0080113 A1* | 3/2023 | Hong | H04W 68/02 |
| | | | 370/329 |
| 2023/0189209 A1 | 6/2023 | Jung et al. | |
| 2023/0189268 A1 | 6/2023 | Kim et al. | |
| 2023/0345332 A1* | 10/2023 | Wang | H04W 36/144 |
| 2024/0056792 A1* | 2/2024 | Selvaganapathy | H04W 8/205 |

OTHER PUBLICATIONS

PCT/ISA/237, Written Opinion dated Jul. 4, 2022 issued in counterpart application No. PCT/KR2022/004146, 4 pages.
Vivo, "[post112-e][256][Multi-SIM] Network switching details (vivo)", 3GPP TSG-RAN WG2 Meeting #113-e R2-2102262 Online, Feb. 10, 2021, pp. 49.

* cited by examiner

METHOD AND DEVICE FOR MANAGING LONG-TIME SWITCHING TIMER IN WIRELESS COMMUNICATION SYSTEM

PRIORITY

This application is a National Phase Entry of PCT International Application No. PCT/KR2022/004146, which was filed on Mar. 24, 2022, and claims priority to Korean Patent Application No. 10-2021-0039678, which was filed on Mar. 26, 2021, the entire content of which is incorporated herein by reference.

TECHNICAL FIELD

The present disclosure relates to a method and apparatus with which a user equipment (UE) supporting a plurality of universal subscriber identity modules (USIMs) manages a long-time switching timer in a wireless communication system.

BACKGROUND ART

A $5^{th}$ (5G) mobile communication technology defines a broad frequency band to enable a high date rate and new services, and may be implemented not only in a 'Sub 6 GHz' band including 3.5 GHz but also in an ultra high frequency band ('Above 6 GHz') called millimeter wave (mmWave) including 28 GHz, 39 GHz, and the like. Also, for a 6G mobile communication technology called a system beyond 5G communication (beyond 5G), in order to achieve a data rate fifty times faster than the 5G mobile communication technology and ultra-low latency one-tenth of the 5G mobile communication technology, implementation of the 6G mobile communication technology in the terahertz band (e.g., the 95 GHz to 3 THz band) is being considered.

In the early phase of the development of the 5G mobile communication technology, in order to support services and satisfy performance requirements of enhanced Mobile BroadBand (eMBB), Ultra Reliable Low Latency Communications (URLLC), and massive Machine-Type Communications (mMTC), there has been ongoing standardization about beamforming and massive multiple input multiple output (MIMO) for mitigating pathloss of radio waves and increasing transmission distances of radio wave in a mmWave band, supporting numerologies (for example, operation of multiple subcarrier spacings) for efficiently utilizing mmWave resources and dynamic operation of slot formats, initial access technologies for supporting multi-beam transmission and broadband, definition and operation of bandwidth part (BWP), new channel coding methods such as a low density parity check (LDPC) code for a large amount of data transmission and a polar code for highly reliable transmission of control information, L2 pre-processing, and network slicing for providing a dedicated network specialized to a specific service.

Currently, there are ongoing discussions about improvement and performance enhancement of initial 5G mobile communication technologies in consideration of services to be supported by the 5G mobile communication technology, and there has been physical layer standardization of technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) that is UE-satellite direct communication for providing coverage in an area in which communication with terrestrial networks is unavailable, and positioning.

Moreover, there has been ongoing standardization of air interface architecture/protocol regarding technologies such as industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR), and standardization of system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

When the 5G mobile communication system is commercialized, connected devices being on a rapidly increasing trend are being predicted to be connected to communication networks, and therefore, it is predicted that enhancement of functions and performance of the 5G mobile communication system and integrated operations of the connected devices are required. To this end, new researches are scheduled for extended Reality (XR) for efficiently supporting Augmented Reality (AR), Virtual Reality (VR), Mixed Reality (MR) and the like, 5G performance improvement and complexity reduction by utilizing artificial intelligence (AI) and machine learning (ML), AI service support, metaverse service support, drone communication, and the like.

Also, such development of the 5G mobile communication system will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of the 6G mobile communication technologies and improving system networks, AI-based communication technology for implementing system optimization by utilizing satellites and AI from a design stage and internalizing end-to-end AI support functions, and next-generation distributed computing technology for implementing services at levels of complexity exceeding the limit of UE operation capability by utilizing ultra-high-performance communication and computing resources.

DESCRIPTION OF EMBODIMENTS

Solution to Problem

The present disclosure may provide a method and apparatus with which a user equipment (UE) supporting a plurality of universal subscriber identity modules (USIMs) performs communication via a long-time switching timer in a wireless communication system.

MODE OF DISCLOSURE

Figure 1A:
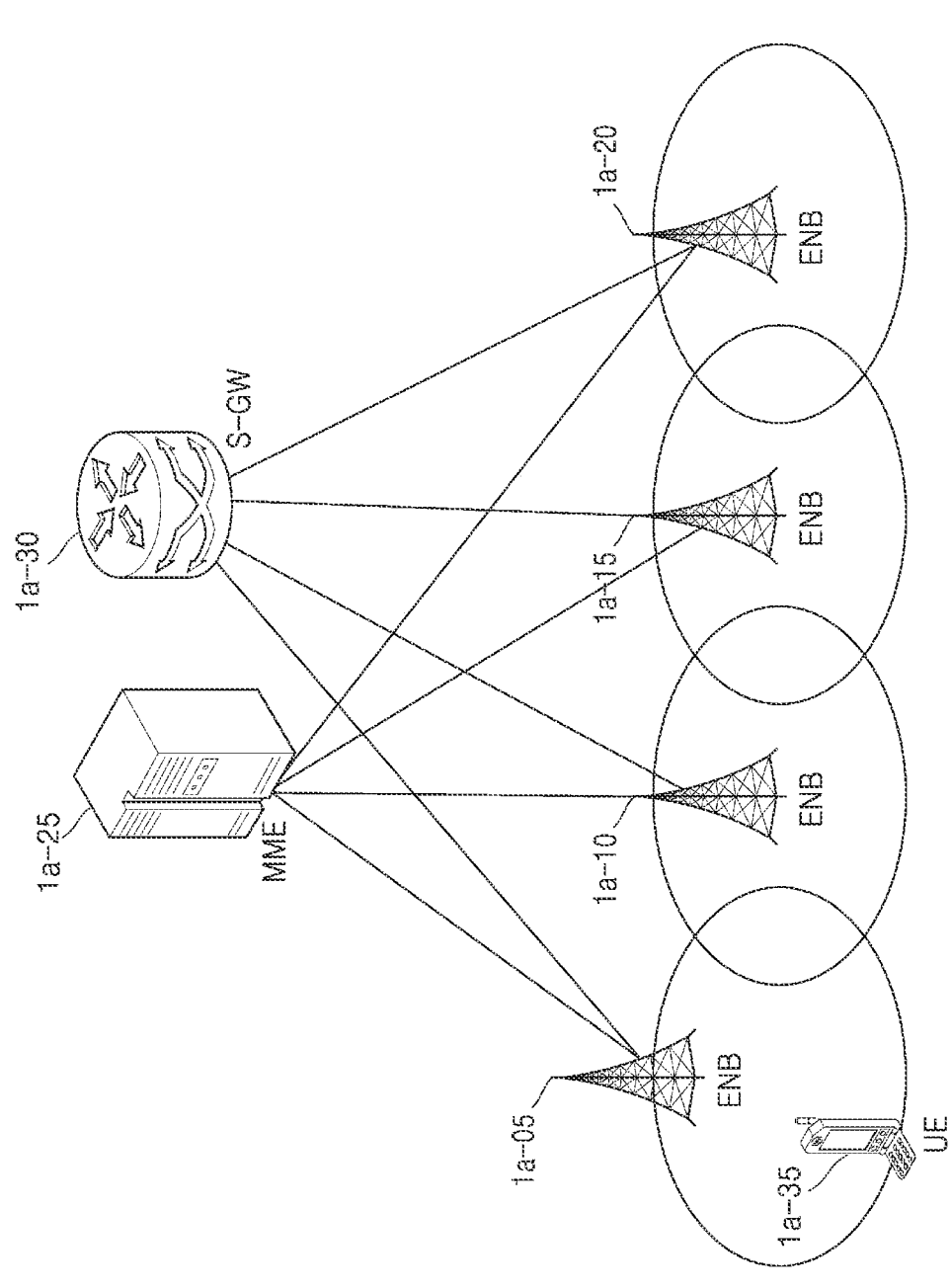
FIG. 1A is a diagram illustrating a configuration of a long term evolution (LTE) system, according to an embodiment of the present disclosure.

Advantages and features of the present disclosure and methods of accomplishing the same may be understood more readily by reference to the following detailed descriptions of embodiments and accompanying drawings of the present disclosure. The present disclosure may, however, be embodied in many different forms and should not be construed as being limited to the embodiments set forth herein. Rather, these embodiments are provided so that the present disclosure will be thorough and complete and will fully convey the concept of the present disclosure to one of ordinary skill in the art, and the present disclosure will only be defined by the appended claims. Throughout the specification, like reference numerals denote like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit" as used in the present embodiment refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, according to an embodiment, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the elements and " . . . units" may be combined into fewer elements and " . . . units" or further separated into additional elements and " . . . units". Further, the elements and " . . . units" may be implemented to operate one or more central processing units (CPUs) in a device or a secure multimedia card. Also, according to an embodiment, a " . . . unit" may include one or more processors.

In the description of the present disclosure, detailed descriptions of the related art are omitted when it is deemed that they may unnecessarily obscure the essence of the present disclosure. Hereinafter, the present disclosure will be described in detail with reference to accompanying drawings.

Hereinafter, terms identifying an access node, terms indicating network entities, terms indicating messages, terms indicating an interface between network entities, and terms indicating various pieces of identification information, as used in the following description, are exemplified for convenience of descriptions. Accordingly, the present disclosure is not limited to terms to be described below, and other terms indicating objects having equal technical meanings may be used.

Hereinafter, for convenience of descriptions, terms and names defined in the 3rd Generation Partnership Project Long Term Evolution (3GPP LTE) standard may be used in the present disclosure. However, the present disclosure is not limited to these terms and names, and may be equally applied to systems conforming to other standards. In the present disclosure, an evolved node B (eNB) may be interchangeably used with a next-generation node B (gNB) for convenience of descriptions. That is, a BS described by an eNB may represent a gNB. In the present disclosure, the term "terminals" may refer to not only mobile phones, narrowband Internet of Things (NB-IoT) devices, and sensors but also other wireless communication devices.

Hereinafter, a base station is an entity that allocates resources to a terminal, and may be at least one of a gNode B, an eNode B, a Node B, a base station (BS), a radio access unit, a BS controller, or a node on a network. A terminal may include a user equipment (UE), a mobile station (MS), a cellular phone, a smartphone, a computer, or a multimedia system capable of performing a communication function. However, the present disclosure is not limited to the above example.

In particular, the present disclosure may be applied to the 3GPP new radio (NR) (the 5G mobile communication standard). The present disclosure is applicable to intelligent services (e.g., smart home, smart building, smart city, smart car or connected car, health care, digital education, retail, security, and safety services) based on 5G communication technology and IoT technology. In the present disclosure, an eNB may be interchangeably used with a gNB for convenience of descriptions. That is, a BS described by an eNB may represent a gNB. In the present disclosure, the term "terminals" may refer to not only mobile phones, NB-IoT devices, and sensors but also other wireless communication devices.

Wireless communication systems providing voice-based services in early stages are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD), ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The UL refers to a radio link for transmitting data or a control signal from a terminal (e.g., a UE or an MS) to a base station (e.g., an eNB or a BS), and the DL refers to a radio link for transmitting data or a control signal from the base station to the terminal. The above-described multiple access schemes identify data or control information of each user in a manner that time-frequency resources for carrying the data or control information of each user are allocated and managed not to overlap each other, that is, to achieve orthogonality therebetween.

As post-LTE communication systems, i.e., 5G communication systems need to support services capable of freely reflecting and simultaneously satisfying various requirements of users, service providers, and the like. Services considered for the 5G systems include enhanced mobile broadband (eMBB), massive machine-type communication (mMTC), ultra-reliability low-latency communication (URLLC) services, or the like.

According to some embodiments, the eMBB aims to provide an improved data rate than a data rate supported by the legacy LTE, LTE-A, or LTE-Pro. For example, in a 5G communication system, the eMBB should be able to provide a peak data rate of 20 Gbps in a DL and a peak data rate of 10 Gbps in an UL at one BS. Also, the 5G communication system may have to simultaneously provide the peak data rate and an increased user-perceived data rate of a UE. In order to satisfy such requirements, the 5G communication system may be requested to have an improvement in transmission/reception technology including an improved multiple-input multiple-output (MIMO) transmission technology. Also, a data rate required in the 5G communication system may be satisfied by using a frequency bandwidth wider than 20 MHz in the 3 GHz to 6 GHz or 6 GHz or more frequency band, instead of the current LTE transmitting a signal by using maximum 20 MHz in the 2 GHz band.

Simultaneously, the mMTC is being considered to support application services such as IoT in the 5G communication system. In order to efficiently provide the IoT, the mMTC may require the support for a large number of terminals in a cell, improved coverage for a terminal, improved battery time, reduced costs of a terminal, and the like. Because the IoT is attached to various sensors and various devices to provide a communication function, the mMTC should be able to support a large number of terminals (e.g., 1,000,000 terminals/km$^2$) in a cell. Also, because a terminal supporting the mMTC is likely to be located in a shadow region failing to be covered by the cell, such as the basement of a building, due to the characteristics of the service, the terminal may require wider coverage than other services provided by the 5G communication system. The terminal supporting the mMTC should be configured as a low-cost terminal and may require a very long battery life time of 10 to 15 years because it is difficult to frequently replace the battery of the terminal.

Lastly, the URLLC refers to cellular-based wireless communication services used for mission-critical purposes such as services for remote control of robots or machinery, industrial automation, unmanned aerial vehicles, remote health care, emergency alerts, and the like. Therefore, the URLLC should provide communications providing very low latency (ultra low latency) and very high reliability (ultra high reliability). For example, a service supporting the URLLC should satisfy air interface latency of less than 0.5 milliseconds, and simultaneously has a requirement for a packet error rate of 105 or less. Thus, for the service supporting the URLLC, the 5G system should provide a transmit time interval (TTI) smaller than other services and may simultaneously have a design requirement for allocating wide resources in a frequency band so as to ensure reliability of a communication link.

The three services considered in the 5G communication system, i.e., the eMBB, the URLLC, and the mMTC, may be multiplexed and transmitted in one system. Here, in order to satisfy different requirements of the services, the services may use different transceiving schemes and different transceiving parameters. However, the mMTC, URLLC, and eMBB services are merely examples of different services, and the types of services to which the present disclosure is applicable are not limited thereto.

Although LTE, LTE-A, LTE Pro, or 5G (or NR, next-generation mobile communication) systems are mentioned as examples in the following description, embodiments of the present disclosure may also be applied to other communication systems having similar technical backgrounds or channel types. Furthermore, the embodiments of the present disclosure may also be applied to other communication systems through partial modification without greatly departing from the scope of the present disclosure based on determination by one of ordinary skill in the art.

The terms used in the specification are defined in consideration of functions used in the present disclosure, and can be changed according to the intent or commonly used methods of users or operators. Accordingly, definitions of the terms are understood based on the entire description of the present specification.

FIG. 1A is a diagram illustrating a configuration of an LTE system, according to an embodiment of the present disclosure.

Referring to FIG. 1A, a radio access network (RAN) of the LTE system includes a plurality of eNBs (or nodes B or BSs) 1a-05, 1a-10, 1a-15, and 1a-20, a mobility management entity (MME) 1a-25, and a serving-gateway (S-GW) 1a-30. A UE (or a terminal) 1a-35 accesses an external network via the eNB 1a-05, 1a-10, 1a-15, or 1a-20 and the S-GW 1a-30.

In FIG. 1A, the eNB 1a-05, 1a-10, 1a-15, or 1a-20 corresponds to a legacy node B of a universal mobile telecommunications system (UMTS). The eNB may be connected to the UE 1a-35 via wireless channels and may perform complex functions compared to the legacy node B. All user traffic data including real-time services such as voice over Internet protocol (VOIP) may be serviced through shared channels in the LTE system, and thus an entity for collating status information, e.g., buffer status information of UEs, available transmission power status information, and channel state information and performing scheduling may be required and the eNB 1a-05, 1a-10, 1a-15, or 1a-20 may operate as such an entity. One eNB generally controls a plurality of cells. For example, the LTE system may use radio access technology such as Orthogonal Frequency Division Multiplexing (OFDM) in a bandwidth of 20 MHz to achieve a data rate of 100 Mbps. Furthermore, the eNB may also use adaptive modulation & coding (AMC) to determine a modulation scheme and a channel coding rate in accordance with a channel state of the UE. The S-GW 1a-30 is an entity for providing data bearers and may establish and release the data bearers under the control of the MME 1a-25. The MME is an entity for performing a mobility management function and various control functions on the UE and is connected to the plurality of eNBs.

Figure 1B:
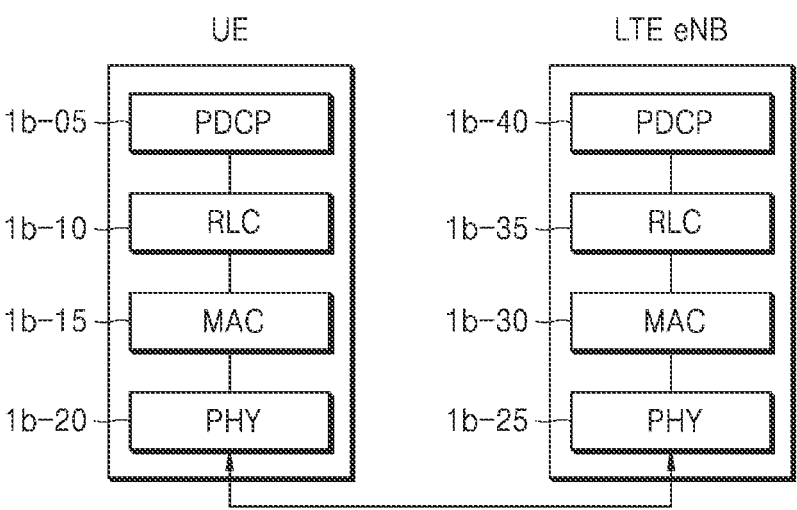
FIG. 1B is a diagram illustrating a radio protocol architecture of an LTE system, according to an embodiment of the present disclosure.

FIG. 1B is a diagram illustrating a radio protocol architecture of an LTE system, according to an embodiment of the present disclosure.

Referring to FIG. 1B, radio protocols of the LTE system may include Packet Data Convergence Protocol (PDCP) layers 1b-05 and 1b-40, RLC layers 1b-10 and 1b-35, and Medium Access Control (MAC) layers 1b-15 and 1b-30 respectively in a UE and an eNB. The PDCP layer 1b-05 or 1b-40 may perform, for example, IP header compression/decompression. Main functions of the PDCP layer are summarized as shown below.

Header compression and decompression: robust header compression (ROHC) only
Transfer of user data
In-sequence delivery of upper layer packet data units (PDUs) at PDCP re-establishment procedure for RLC acknowledged mode (AM)
For split bearers in DC (only support for RLC AM): PDCP PDU routing for transmission and PDCP PDU reordering for reception
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The RLC layer 1b-10 or 1b-35 may perform an automatic repeat request (ARQ) operation by reconfiguring Packet Data Convergence Protocol Packet Data Units (PDCP PDUs) to appropriate sizes. Main functions of the RLC layer may be summarized as shown below.

Transfer of upper layer PDUs
Error Correction through ARQ (only for AM data transfer)
Concatenation, segmentation and reassembly of RLC SDUs (only for unacknowledged mode (UM) and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 1b-15 or 1b-30 may be connected to a plurality of RLC layer entities configured for one UE and may multiplex RLC PDUs into a MAC PDU and may demultiplex the RLC PDUs from the MAC PDU. Main functions of the MAC layer may be summarized as shown below.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
Multimedia broadcast/multicast service (MBMS) service identification Transport format selection Padding A physical (PHY) layer 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 1C:
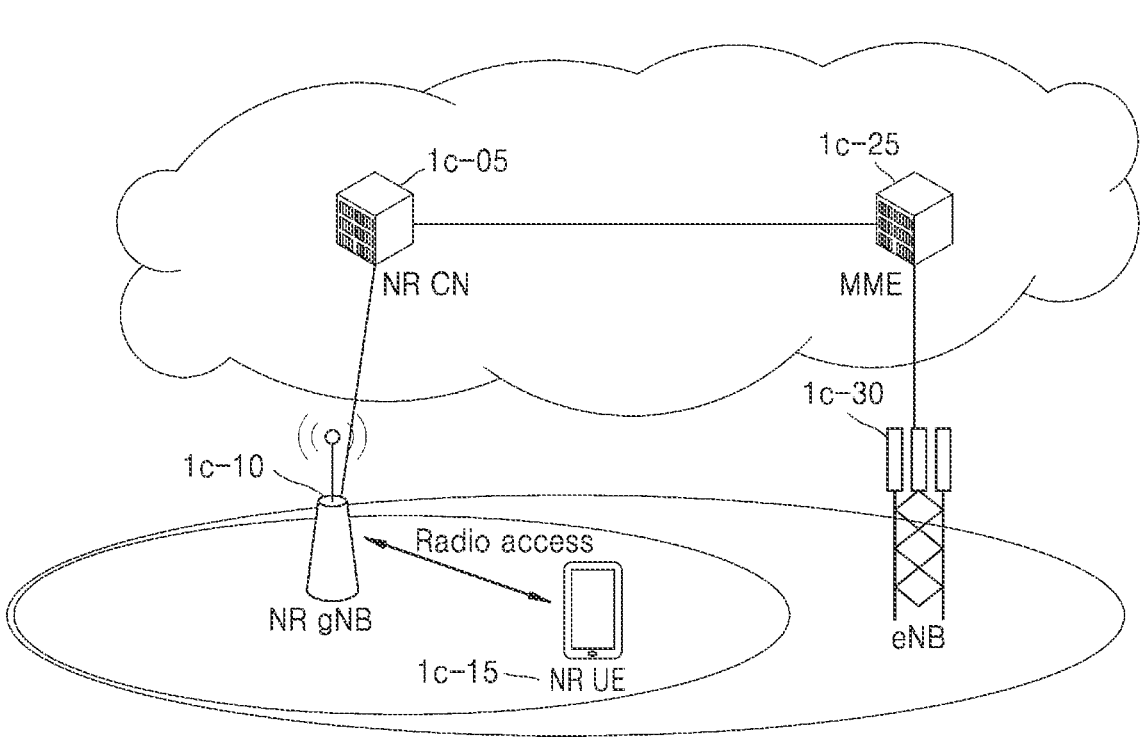
FIG. 1C is a diagram illustrating an architecture of a next-generation mobile communication system, according to an embodiment of the present disclosure.

FIG. 1C is a diagram illustrating an architecture of a next-generation mobile communication system, according to an embodiment of the present disclosure.

Referring to FIG. 1C, as illustrated, a radio access network of the next-generation mobile communication system (hereinafter, referred to as the NR or 5G communication system) includes a new radio node B (NR gNB or NR BS) 1c-10 and a new radio core network (NR CN) 1c-05. A NR UE (or terminal) 1c-15 may access an external network via the NR gNB 1c-10 and the NR CN 1c-05.

In FIG. 1C, the NR gNB 1c-10 may correspond to an eNB of the legacy LTE system. The NR gNB may be connected to the NR UE 1c-15 through radio channels and may provide superior services compared to a legacy node B. All user traffic data may be serviced through shared channels in the NR or 5G mobile communication system, and thus, an entity for collating buffer status information of UEs, available transmission power status information, and channel state information and performing scheduling may be required and the NR gNB 1c-10 may operate as such an entity. One NR gNB generally controls a plurality of cells. A bandwidth greater than the maximum bandwidth of the legacy LTE system may be used to achieve an ultra-high data rate, compared to the legacy LTE system, and OFDM may be used as a radio access technology and a beamforming technology may be additionally applied thereto. Furthermore, AMC may be applied to determine a modulation scheme and a channel coding rate in accordance with a channel state of the UE. The NR CN 1c-05 performs functions such as mobility support, bearer configuration, and quality of service (QOS) configuration. The NR CN is an entity for performing a mobility management function and various control functions on the NR UE and is connected to a plurality of BSs. Also, the NR or 5G communication system may cooperate with the legacy LTE system, and the NR CN may be connected to an MME 1c-25 via a network interface. The MME is connected to an eNB 1c-30 that is a legacy BS.

Figure 1D:
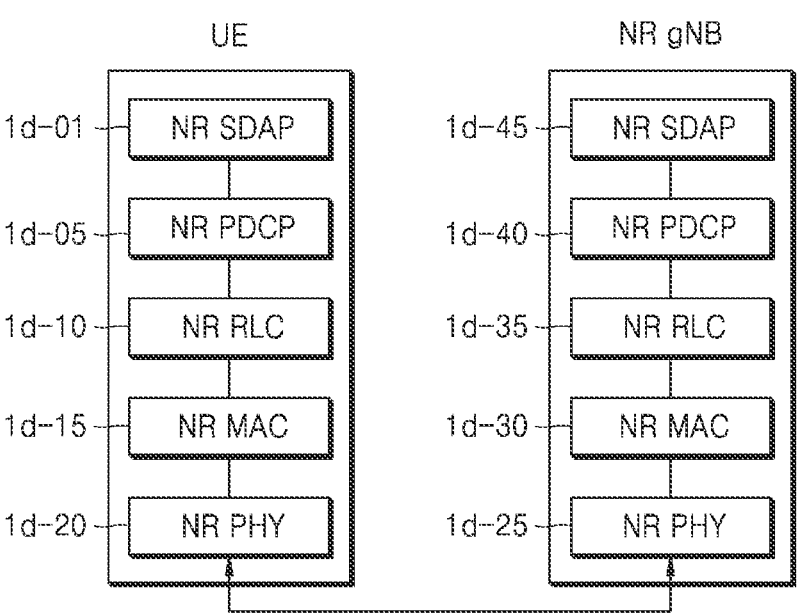
FIG. 1D is a diagram illustrating a radio protocol architecture of a next-generation mobile communication system, according to an embodiment of the present disclosure.

FIG. 1D is a diagram illustrating a radio protocol architecture of the NR or 5G communication system, according to an embodiment of the present disclosure.

FIG. 1D is a diagram illustrating a radio protocol architecture of the NR or 5G communication system to which the present disclosure is applicable, according to an embodiment of the present disclosure.

Referring to FIG. 1D, the radio protocol architecture of the NR or 5G communication system may include NR Service Data Adaptation Protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

Main functions of the NR SDAP layer 1d-01 or 1d-45 may include some of the following functions.

Transfer of user plane data

Mapping between a QoS flow and a DRB for both DL and UL

Marking QoS flow identifier (ID) in both DL and UL packets

Reflective QoS flow to DRB mapping for the UL SDAP PDUs.

With regard to a SDAP layer entity, the UE may be configured with information about whether to use a header of the SDAP layer entity or to use functions of the SDAP layer entity, through a Radio Resource Control (RRC) message per PDCP layer entity, per bearer, or per logical channel. Also, when the SDAP header is configured, a 1-bit non access stratum (NAS) reflective QoS indicator and a 1-bit access stratum (AS) reflective QoS indicator of the SDAP header may indicate the UE to update or reconfigure UL and DL QoS flow and data bearer mapping information. The SDAP header may include QoS flow ID information indicating QoS. The QoS information may be used as data processing priority information or scheduling information for appropriately supporting a service.

Main functions of the NR PDCP layer 1d-05 or 1d-40 may include some of the following functions.

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

In the above, the reordering function of the NR PDCP layer entity may include a function of reordering PDCP PDUs received from a lower layer, on a PDCP sequence number (SN) basis, and a function of delivering the reordered data to an upper layer in order. Alternatively, the reordering function of the NR PDCP layer entity may include a function of delivering the reordered data to an upper layer out of order, a function of recording missing PDCP PDUs by reordering the received PDCP PDUs, a function of reporting status information of the missing PDCP PDUs to a transmitter, and a function of requesting to retransmit the missing PDCP PDUs.

Main functions of the NR RLC layer 1d-10 or 1d-35 may include some of the following functions.

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

In the above, the in-sequence delivery function of the NR RLC layer entity may indicate a function of delivering RLC SDUs received from a lower layer to an upper layer in order, may include a function of reassembling the RLC SDUs and delivering the reassembled RLC SDU when a plurality of RLC SDUs segmented from one RLC SDU are received, may include a function of reordering received RLC PDUs on an RLC SN or PDCP SN basis, may include a function of recording missing RLC PDUs by reordering the received RLC PDUs, a function of reporting status information of the missing RLC PDUs to a transmitter, a function of requesting to retransmit the missing RLC PDUs, a function of delivering only RLC SDUs prior to a missing RLC SDU, to an upper layer in order when the missing RLC SDU exists, a function of delivering all RLC SDUs received before a timer starts, to an upper layer in order although a missing RLC SDU exists when a certain timer expires, or a function of delivering all RLC SDUs received so far, to an upper layer in order although a missing RLC SDU exists when a certain timer expires. Furthermore, in the above, the NR RLC layer entity may process the RLC PDUs in order of reception (regardless of SNs, and in order of arrival) and may deliver the RLC PDUs to the PDCP layer entity in a manner of out-of-sequence delivery, and when it is a segment, the NR RLC layer entity may reassemble the segment with other segments stored in a buffer or subsequently received, into a whole RLC PDU and may transmit the RLC PDU to the PDCP layer entity. The NR RLC layer may not have a concatenation function, and the concatenation function may be performed by the NR MAC layer or be replaced with a multiplexing function of the NR MAC layer.

In the above, the out-of-sequence delivery function of the NR RLC layer entity may include a function of directly delivering RLC SDUs received from a lower layer to an upper layer out of order, a function of reassembling a plurality of RLC SDUs segmented from one RLC SDU and delivering the reassembled RLC SDU when the segmented RLC SDUs are received, and a function of recording missing RLC PDUs by storing RLC SNs or PDCP SNs of received RLC PDUs and reordering the received RLC PDUs.

The NR MAC layer 1d-15 or 1d-30 may be connected to a plurality of NR RLC layers configured for one UE, and main functions of the NR MAC layer may include some of the following functions.

An NR PHY layer 1d-20 or 1d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

Figure 1E:
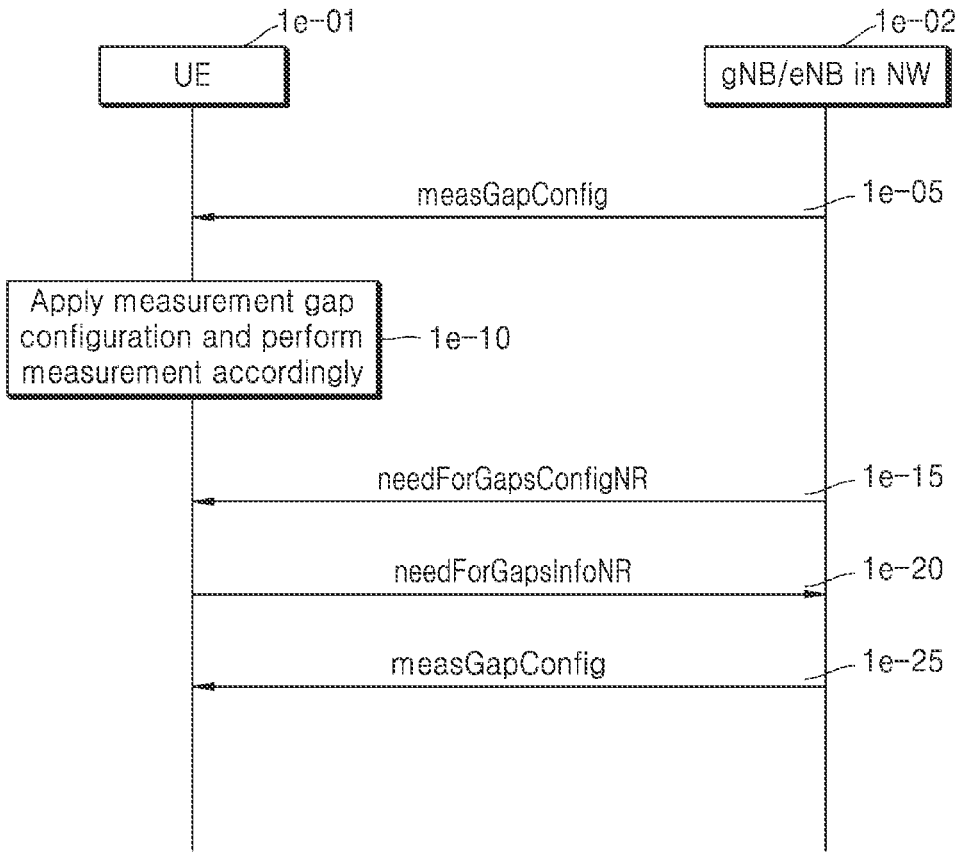
FIG. 1E is a flowchart of a procedure in which a user equipment (UE) in a radio resource control (RRC) connection mode (RRC_CONNECTED) performs measurement based on measurement configuration information configured by a base station (BS).

FIG. 1E is a flowchart of a procedure in which a UE in an RRC connection mode (RRC_CONNECTED) performs measurement based on measurement configuration information configured by a BS.

Referring to FIG. 1E, in operation 1e-05, a UE 1e-01 may receive, from a gNB/eNB (BS) 1e-02, a preset RRC message (e.g., an RRC connection resume message (RRCResume) or an RRC connection reconfiguration message (RRCReconfiguration) including measurement configuration information (measConfig). The measurement configuration information may indicate measurement configuration information the UE applies in the RRC_CONNECTED mode. The measurement configuration information (measConfig) may include measurement gap configuration information (MeasGapConfig). The measurement gap configuration information (MeasGapConfig) may include gap configuration information (GapConfig) for each frequency range (FR) (e.g., gapFR1 or gapFR2) or may include gap configuration information to be applied to a UE (e.g., gapUE) regardless of an FR. The measurement gap configuration information (MeasGapConfig) may include parameters of at least one of the followings, and definition of each parameter is as below.

```
MeasGapConfig ::=          SEQUENCE {
    gapFR2                     SetupRelease { GapConfig }
                      OPTIONAL, -- Need M, ...,
    [[.,
    gapFR1                     SetupRelease { GapConfig }
                      OPTIONAL, -- Need M,
    gapUE                      SetupRelease { GapConfig }
                      OPTIONAL -- Need M, ]]
}
GapConfig ::=              SEQUENCE {
    gapOffset                  INTEGER (0..159),
    mgl                        ENUMERATED {ms1dot5, ms3, ms3dot5, ms4, ms5dot5, ms6},
    mgrp                       ENUMERATED {ms20, ms40, ms80, ms160},
    mgta                       ENUMERATED {ms0, ms0dot25, ms0dot5}, ...,
    [[
    refServCellIndicator       ENUMERATED {pCell, pSCell, mcg-FR2}
                OPTIONAL -- Cond NEDCorNRDC
    ]],
    [[
    refFR2ServCellAsyncCA-r16 ServCellIndex
                OPTIONAL, -- Cond AsyncCA
    mgl-r16                    ENUMERATED {ms10, ms20}
                OPTIONAL -- Cond PRS
    ]]
}
```

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding gapFR1
Indicates measurement gap configuration that applies to FR1 only. In (NG)EN-DC, gapFR1 cannot be set up by NR RRC (i.e. only LTE RRC can configure FR1 measurement gap). In NE-DC, gapFR1 can only be set up by NR RRC (i.e. LTE RRC cannot configure FR1 gap). In NR-DC, gapFR1 can only be set up in the measConfig associated with MCG. gapFR1 can not be configured together with gapUE. The applicability of the FR1 measurement gap is according to Table 9.1.2-2 and Table 9.1.2-3 in TS 38.133 [14].

-continued gapFR2
Indicates measurement gap configuration applies to FR2 only. In
(NG)EN-DC or NE-DC, gapFR2 can only be set up by NR RRC (i.e. LTE
RRC cannot configure FR2 gap). In NR-DC, gapFR2 can only be set up
in the measConfig associated with MCG. gapFR2 cannot be configured
together with gapUE. The applicability of the FR2 measurement gap
is according to Table 9.1.2-2 and Table 9.1.2-3 in TS 38.133 [14].
gapUE
Indicates measurement gap configuration that applies to all frequencies
(FR1 and FR2). In (NG)EN-DC, gapUE cannot be set up by NR RRC (i.e.
only LTE RRC can configure per UE measurement gap). In NE-DC,
gapUE can only be set up by NR RRC (i.e. LTE RRC cannot configure
per UE gap). In NR-DC, gapUE can only be set up in the measConfig
associated with MCG. If gapUE is configured, then neither gapFR1
nor gapFR2 can be configured. The applicability of the per UE
measurement gap is according to Table 9.1.2-2 and Table 9.1.2-3
in TS 38.133 [14].
gapOffset
Value gapOffset is the gap offset of the gap pattern with MGRP
indicated in the field mgrp. The value range is from 0 to mgrp-1.
mgl
Value mgl is the measurement gap length in ms of the measurement gap.
The measurement gap length is according to in Table 9.1.2-1 in TS
38.133 [14]. Value ms1dot5 corresponds to 1.5 ms, ms3 corresponds to
3 ms and so on. If mgl-r16 is signalled, UE shall use (with suffix) and
ignore the mgl (without suffix).
mgrp
Value mgrp is measurement gap repetition period in (ms) of the
measurement gap. The measurement gap repetition period is according
to Table 9.1.2-1 in TS 38.133 [14].
mgta
Value mgta is the measurement gap timing advance in ms. The
applicability of the measurement gap timing advance is according to
clause 9.1.2 of TS 38.133 [14]. Value ms0 corresponds to 0 ms, ms0dot25
corresponds to 0.25 ms and ms0dot5 corresponds to 0.5 ms. For FR2, the
network only configures 0 ms and 0.25 ms.
refFR2ServCellIAsyncCA
Indicates the FR2 serving cell identifier whose SFN and subframe is
used for FR2 gap calculation for this gap pattern with asynchronous
CA involving FR2 carrier(s).
refServCellIndicator
Indicates the serving cell whose SFN and subframe are used for gap
calculation for this gap pattern. Value pCell corresponds to the PCell,
pSCell corresponds to the PSCell, and mcg-FR2 corresponds to a serving
cell on FR2 frequency in MCG.

The measurement gap configuration information (MeasGapConfig) may have features below.

The measurement gap configuration information (MeasGapConfig) is configuration information configured from the BS 1e-02 to the UE 1e-01, and the BS may determine whether to set up or release the gap configuration information (GapConfig). That is, the UE cannot request the BS to set up or release the gap configuration information (GapConfig).

When the BS 1e-02 configures the UE 1e-01 with gap configuration information (GapConfig) for a first frequency range (FR1), each of parameters included in the gap configuration information (GapConfig) cannot be configured as at least two parameters. That is, gapOffset parameter, mgl parameter, mgta parameter, and the like may be configured as only one value. Equally, even when the BS 1e-02 configures the UE 1e-01 with gap configuration information (GapConfig) for a second frequency range (FR2) or the UE 1e-01, each of parameters included in the gap configuration information (GapConfig) cannot be configured as two values.

In operation 1e-10, the UE 1e-01 in an RRC connected mode may perform measurement by applying the measurement gap configuration information (MeasGapConfig). A time point when the measurement is to be performed may be determined as below.

If gapFR1 is set to "setup" (if gapFR1 is set to setup):
    If FR1 measurement gap configuration information is already set up, the UE 1e-01 may release the FR1 measurement gap configuration (if an FR1 measurement gap configuration is already setup, release the FR1 measurement gap configuration);
    In operation 1e-10, the UE 1e-01 may set up FR1 measurement gap configuration information indicated by the received measurement gap configuration information (MeasGapConfig). In detail, a first subframe where each gap occurs and a system frame number (SFN) have to satisfy the condition 1 below (setup the FR1 measurement gap configuration indicated by the measGapConfig in accordance with the received gapOffset, i.e., the first subframe of each gap occurs at an SFN and subframe meeting the following condition 1)
<condition 1>
SFN mod T=FLOOR(gapOffset/10);
subframe=gapOffset mod 10;
with T=MGRP/10 as defined in TS 38.133;
    The UE 1e-01 may apply mgta parameter to gap occurrence based on the condition being satisfied. That is, the UE 1e-01 may apply timing advance indicated by the mgta parameter to a time point of the gap occurrence based on the condition being satisfied. For example, the UE 1e-01 may start measurement before a gap subframe occurrence by the timing advance indicated by the mgta parameter (apply the specified timing advance mgta to the gap occurrences calculated above (i.e. the UE starts the measurement mgta ms before the gap subframe occurrences))
Otherwise, if gapFR1 is set to "release" (else if gapFR1 is set to release:
    the UE 1e-01 may release the FR1 measurement gap configuration information (release the FR1 measurement gap configuration);
If gapFR2 is set to "setup" (if gapFR2 is set to setup):
    if FR2 measurement gap configuration is already set up, the UE 1e-01 may release the FR2 measurement gap configuration information (if an FR2 measurement gap configuration is already setup, release the FR2 measurement gap configuration)
    In operation 1e-10, the UE 1e-01 may set up the FR2 measurement gap configuration information indicated by the received measurement gap configuration information (measGapConfig). In detail, a first subframe where each gap occurs and an SFN have to satisfy the condition 1 above (setup the FR2 measurement gap configuration indicated by the measGapConfig in accordance with the received gapOffset, i.e., the first subframe of each gap occurs at an SFN and subframe meeting the above condition 1:
    The mgta parameter may be applied to gap occurrence based on the condition being satisfied. That is, the UE 1e-01 may apply timing advance indicated by the mgta parameter to a time point of the gap occurrence based on the condition being satisfied. For example, the UE 1e-01 may start measurement before a gap subframe occurrence by the timing advance indicated by the mgta parameter (apply the specified timing advance mgta to the gap occurrences calculated above (i.e. the UE starts the measurement mgta ms before the gap subframe occurrences));

Otherwise, if gapFR2 is set to "release" (else if gapFR2 is set to release:

the UE may release the FR2 measurement gap configuration information (release the FR2 measurement gap configuration);

if gapUE is set to "setup" (if gapUE is set to setup):

if per UE measurement gap configuration is already set up, the UE may release the per UE measurement gap configuration information (if a per UE measurement gap configuration is already setup, release the per UE measurement gap configuration);

In operation 1e-10, the UE may set up per UE measurement gap configuration information indicated by the received measurement gap configuration information (measGapConfig). In detail, a first subframe where each gap occurs and an SFN have to satisfy the condition 1 above (setup the per UE measurement gap configuration indicated by the measGapConfig in accordance with the received gapOffset, i.e., the first subframe of each gap occurs at an SFN and subframe meeting the above condition 1:

The mgta parameter may be applied to gap occurrence based on the condition being satisfied. That is, the UE may apply timing advance indicated by the mgta parameter to a time point of the gap occurrence based on the condition being satisfied. For example, the UE may start measurement before a gap subframe occurrence by the timing advance indicated by the mgta parameter (apply the specified timing advance mgta to the gap occurrences calculated above (i.e. the UE starts the measurement mgta ms before the gap subframe occurrences));

Otherwise, if gapUE is set to "release" (else if gapUE is set to release:

the UE may release per UE measurement gap configuration information (release the per UE measurement gap configuration);

In operation 1e-15, the BS 1e-02 may transmit, to the UE 1e-01, a preset RRC message (e.g., an RRC connection resume message (RRCResume) or an RRC connection reconfiguration message (RRCReconfiguration) including needForGapsConfigNR (configuration information indicating a report of measurement gap requirement information about NR target bands, and requestedTargetBandFilterNR included in needForGapsConfig includes one or more NR frequency band values (FreqBandIndicatiorNR)). When the preset RRC message includes needForGapsConfigNR, the UE may perform a procedure below.

If needForGapsCofigNR is set to "setup" (if needForGapsConfigNR is set to setup):

the UE may identify that it is configured to provide measurement gap requirement information about NR target bands to the BS (consider itself to be configured to provide the measurement gap requirement information of NR target bands);

if needForGapsCofigNR is not configured to "setup" (else), the UE may identify that it is not configured to provide measurement gap requirement information about NR target bands to the BS (consider itself not to be configured to provide the measurement gap requirement information of NR target bands);

In operation 1e-20, when it is configured for the UE 1e-01 to provide measurement gap requirement information about NR target bands to the BS 1e-02, the UE 1e-01 may transmit, to the BS 1e-02, a preset RRC message (e.g., an RRC connection resume completion message (RRCResumeComplete) or an RRC connection reconfiguration completion message (RRCReconfigurationComplete) as a response message to the RRC message received in operation 1e-15) including needForGapsInfoNR (information indicating measurement gap requirements for NR target bands). The UE 1e-01 may add information below to needForGapsInfoNR.

intraFreq-needForGap may include gap requirement information about intra-frequency measurement for each NR serving cell (include intraFreq-needForGap and set the gap requirement information of intra-frequency measurement for each NR serving cell). In more detail, intraFreq-needForGap may include an indicator (servCellId) of each NR serving cell and an indicator (gapIndicationIntra) indicating whether a corresponding NR serving cell requires a gap.

If requestedTargetBandFilterNR is configured, the UE may include an entry in interFreq-needForGap with respect to each supported NR band included in requestedTargetBandFilterNR, and may configure gap requirement information for the NR band.

If requestedTargetBandFilterNR is not configured, the UE may include an entry in interFreq-needForGap with respect to each supported NR band, and may configure gap requirement information corresponding thereto (if requestedTargetBandFilterNR is configured, for each supported band that is also included in requestedTargetBandFilterNR, include an entry in interFreq-needForGap and set the gap requirement information for that band; otherwise, include an entry in interFreq-needForGap and set the corresponding gap requirement information for each supported NR band).

needForGapsInfoNR above may include features below.

The UE 1e-01 may notify the BS 1e-02 of whether a measurement gap is requested for each frequency band or each cell.

In operation 1e-25, the BS 1e-02 may transmit, to the UE 1e-01, a preset RRC message (e.g., an RRC connection resume message (RRCResume) or an RRC connection reconfiguration message (RRCReconfiguration) including measurement configuration information (measConfig). The measurement configuration information (measConfig) may measurement include gap configuration information (MeasGapConfig). Operations thereafter may be equal to operations described above.

Figure 1F:
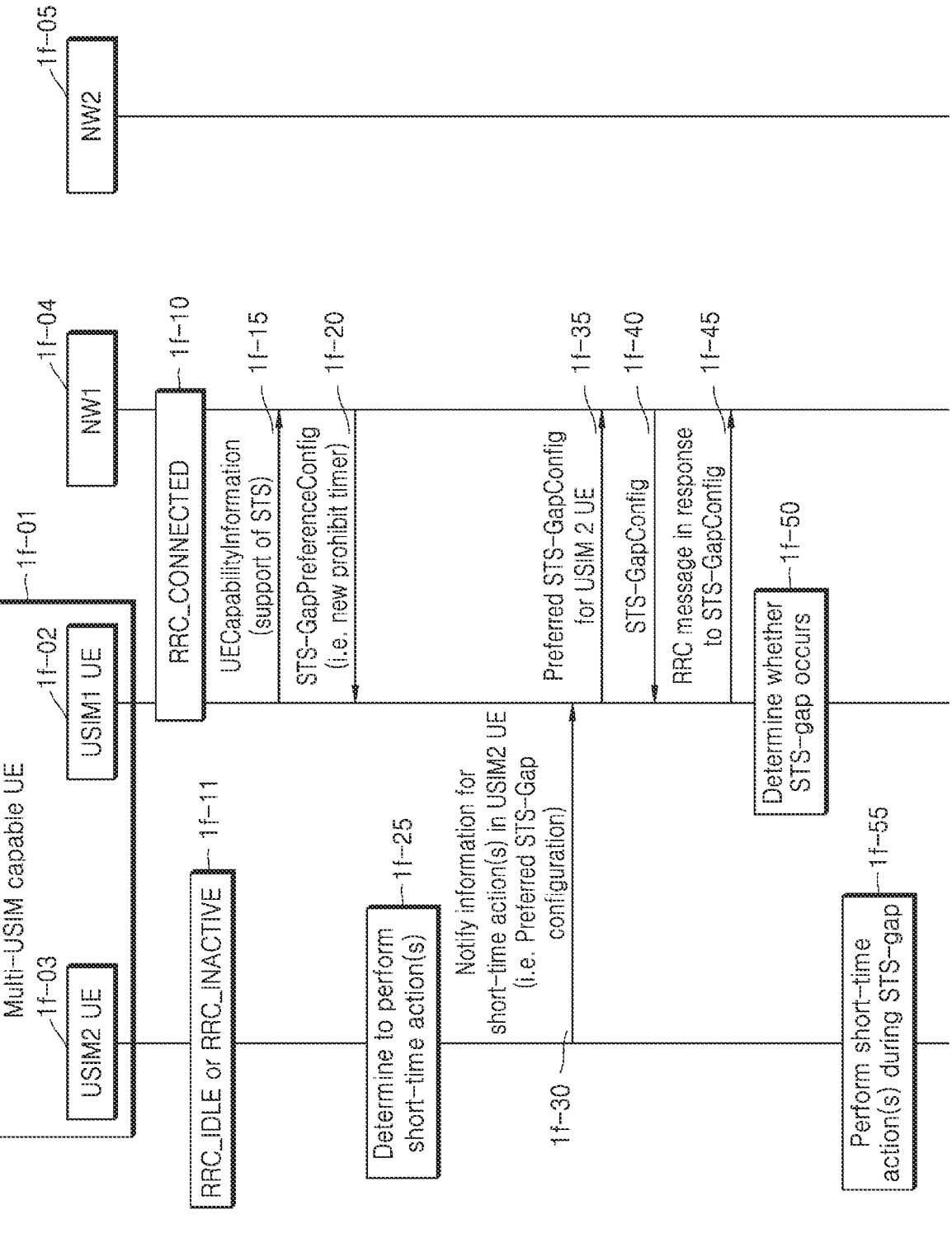
FIG. 1F is a diagram in which a UE supporting multiple universal subscriber identity modules (USIMs) (multi-USIM UE) performs an operation associated with one USIM while the UE maintains its RRC connection mode (RRC_CONNECTED) with a BS associated with another USIM, according to an embodiment of the present disclosure.

FIG. 1F is a diagram in which a UE supporting multiple universal subscriber identity modules (USIMs) (multi-USIM UE) performs an operation associated with one USIM while the UE maintains its RRC connection mode (RRC_CONNECTED) with a BS associated with another USIM, according to an embodiment of the present disclosure.

A multi-USIM UE 1f-01 according to an embodiment of the present disclosure may refer to a UE that supports two or more USIMs. For convenience of descriptions, in the present disclosure, a dual-USIM UE that supports two USIMs is considered. The dual-USIM UE may transmit data only to a BS associated with one USIM, in a given time. (It is obvious that data may be simultaneously transmitted to BSs respectively associated with USIMs.) On the other hand, the dual-USIM UE is enabled to receive data from a BS associated with one USIM or simultaneously receive data from BSs respectively associated with USIMs, in a given time.

Referring to FIG. 1F, the multi-USIM UE 1f-01 may refer to a UE capable of supporting a plurality of USIMs in one device. For example, the multi-USIM UE may indicate a USIM 1 UE 1f-02 when operating with USIM 1 and may indicate a USIM 2 UE 1f-03 when operating with USIM 2.

A BS may not recognize the multi-USIM as one UE but may recognize a UE for each of multiple USIMs. For example, a NW1 1*f*-04 may recognize the USIM 1 UE 1*f*-02 as one UE, and a NW2 1*f*-05 may recognize the USIM 2 UE 1*f*-03 as one UE. Hereinafter, in embodiments of the present disclosure, for convenience of descriptions, when a multi-USIM UE performs communication by using USIM 1, the multi-USIM UE is referred to as a USIM 1 UE, and when the multi-USIM UE performs communication by using USIM 2, the multi-USIM UE is referred to as a USIM 2 UE. That is, the multi-USIM UE may be the USIM 1 UE or the USIM 2 UE, depending on which USIM among USIM 1 and USIM 2 is used.

In operation 1*f*-10, the USIM 1 UE 1*f*-02 may be in an RRC connection mode (RRC_CONNECTED) by establishing RRC connection to the NW1 1*f*-04. In the RRC connection mode, the USIM 1 UE 1*f*-02 may transmit and receive data to and from the NW1 1*f*-04.

In operation 1*f*-11, the USIM 2 UE 1*f*-03 may not establish RRC connection to the NW2 1*f*-05 but may be in an RRC idle mode (RRC_IDLE) or an RRC inactive mode (RRC_INACTIVE).

In operation 1*f*-15, the USIM 1 UE 1*f*-02 may transmit a UE capability information message (UECapabilityInformation) to the NW1 1*f*-04. The UE capability information message (UECapabilityInformation) may include an indicator or an information element indicating that the USIM 1 UE 1*f*-02 supports multiple USIMs. Alternatively, the UE capability information message may include, for a multi-USIM operation, an indicator indicating that the USIM 2 UE 1*f*-03 can communicate with the NW2 1*f*-05 or UE capability information indicating that information (e.g., switching gap configuration information required/preferred by the USIM 2 UE 1*f*-03 to perform an operation associated with the NW2 1*f*-05) necessary for the USIM 2 UE 1*f*-03 to perform communication with the NW2 1*f*-05 can be transmitted, while the USIM 1 UE 1*f*-02 maintains an RRC connection mode with respect to the NW1 1*f*-04.

Hereinafter, in embodiments of the present disclosure, for convenience of descriptions, a procedure in which the USIM 2 UE 1*f*-03 performs an operation associated with the NW2 1*f*-05 while the USIM 1 UE 1*f*-02 maintains an RRC connection mode with respect to the NW1 1*f*-04 may be referred to as a short-time switching (STS) procedure. That is, the USIM 1 UE 1*f*-02 may notify the NW1 1*f*-04 of information about whether the STS is supported (a support of the STS), by including the information in the UE capability information message (UECapabilityInformation). Obviously, in case that the USIM 1 UE 1*f*-02 leaves the RRC connection mode with respect to the NW1 1*f*-04, an indicator requesting to perform communication with the NW2 1*f*-05 by using the USIM 2 UE 1*f*-03 may be included in the UE capability information message (UECapabilityInformation), and the indicator may be or may not be distinguished from whether the STS is supported.

In operation 1*f*-20, the NW1 1*f*-04 may transmit, to the USIM 1 UE 1*f*-02, a preset RRC message including STS gap preference configuration information (STS-GapPreferenceConfig). For example, the preset RRC message may refer to an RRCReconfiguration message. The STS gap preference configuration information (STS-GapPreferenceConfig) may include at least one of the followings.

An indicator or an information element indicating, by the NW1 1*f*-04, whether the USIM 1 UE 1*f*-02 can perform an STS procedure The NW1 1*f*-04 configures the USIM 1 UE 1*f*-02 with the indicator or the information element, such that the USIM 1

UE 1*f*-02 may determine that it is available to perform the STS procedure with the NW1 1*f*-04.

A new prohibit timer value for the STS procedure (new prohibit timer)

When the NW1 1*f*-04 configures or sets up a prohibit timer value for the USIM 1 UE 1*f*-02, the USIM 1 UE 1*f*-02 may determine that it is available to perform the STS procedure with the NW1 1*f*-04. When the STS procedure starts (i.e., when a preset RRC message or MAC control element (CE) for the STS is transmitted to the NW1), the USIM 1 UE 1*f*-02 may start a timer with the prohibit timer value. The NW1 1*f*-04 may release the prohibit timer value with respect to the USIM 1 UE 1*f*-02, and when it is released, the USIM 1 UE 1*f*-02 may determine that it is not available to perform the STS procedure with the NW1 1*f*-04. When the NW1 1*f*-04 configures the USIM 1 UE 1*f*-02 with the prohibit timer value, the NW1 1*f*-04 may set the prohibit timer value to be smaller than or equal to or smaller than a dataInactivity timer value. In operation 1*f*-25, the USIM 2 UE 1*f*-03 may determine whether to perform a preset operation in an RRC idle mode or an RRC inactive mode. The preset operation may mean that the USIM 2 UE 1*f*-03 may perform at least one of following operations. However, the present disclosure is not limited to the operations below.

The USIM 2 UE 1*f*-03 monitors a paging channel or a short message associated with the NW2 1*f*-05. For example, the USIM 2 UE 1*f*-03 may monitor a paging occasion for every discontinuous reception (DRX) cycle.

The USIM 2 UE 1*f*-03 performs monitoring to receive a system information change notification associated with the NW2 1*f*-05. For example, the USIM 2 UE 1*f*-03 may monitor a paging occasion for every DRX cycle.

The USIM 2 UE 1*f*-03 may request and obtain on-demand system information so as to obtain system information periodically broadcast and associated with the NW2 1*f*-05 or obtain the system information in an on-demand manner.

The USIM 2 UE 1*f*-03 performs a cell selection or cell reselection evaluation procedure. For example, the USIM 2 UE may perform measurement of a serving cell or a neighboring cell, as the cell selection or cell reselection evaluation procedure.

The USIM 2 UE 1*f*-03 may perform a public land mobile network (PLMN) selection procedure.

The USIM 2 UE 1*f*-03 may perform a registration update procedure or an RAN notification area update procedure.

The USIM 2 UE 1*f*-03 may transmit and receive a short message service (SMS) to and from the NW2 1*f*-05.

In a case where a paging message transmitted from the NW2 1*f*-05 includes a UE identifier indicating the USIM 2 UE 1*f*-03 but the USIM 1 UE 1*f*-02 has to continuously perform data transmission and reception with the NW1 1*f*-04, the USIM 2 UE 1*f*-03 may perform a procedure for transmitting busy indication indicating that the paging message received from the NW2 1*f*-05 cannot be responded. For example, the procedure for transmitting the busy indication may mean a procedure in which, after the USIM 2 UE 1*f*-03 in an RRC idle mode performs an RRC connection configuration procedure with the NW2 1*f*-05 and then transitions to an RRC connection mode, the USIM 2 UE 1*f*-03 notifies that a paging message from the NW2 1*f*-05 is well received but cannot be responded, by including the busy indication in a dedicated NAS message included in an RRCSetupComplete message or an RRCSetupComplete message. Alternatively, the procedure for transmitting the busy indication may mean a procedure in which, after the USIM 2 UE 1f-03 in an RRC inactive mode performs an RRC connection configuration procedure with the NW2 1f-05 and then transitions to an RRC connection mode, the USIM 2 UE 1f-03 notifies that a paging message from the NW2 1f-05 is well received but cannot be responded, by including the busy indication in a dedicated NAS message included in an RRCSetupComplete message or an RRCSetupComplete message, or the USIM 2 UE 1f-03 notifies that a paging message from the NW2 1f-05 is well received but cannot be responded, by including the busy indication in an RRCResumeRequest message.

The operation above may be a periodic operation, an aperiodic operation, or a one-time operation.

When the USIM 2 UE 1f-03 performs the aforementioned operation, the USIM 2 UE 1f-03 may perform operations below according to Tx/Rx capabilities of the multi-USIM UE 1f-01.

The USIM 1 UE 1f-02 may suspend or not perform transmission with respect to the NW1 1f-04.

If the multi-USIM UE 1f-01 is capable of simultaneously receiving data for respective USIMs, the USIM 2 UE 1f-03 may perform reception with respect to the NW1 1f-04. Otherwise, the USIM 1 UE 1f-02 may suspend or not perform data reception with respect to the NW1 1f-04.

In operation 1f-30, the USIM 2 UE 1f-03 may notify the USIM 1 UE 1f-02 of information required to perform, in an RRC idle mode or an RRC inactive mode, the operation described in operation 1f-25 (information for short-time action in USIM 2 UE). For example, the USIM 2 UE 1f-03 may transmit Preferred STS-GapConfig information to the USIM 1 UE 1f-02.

In operation 1f-35, the USIM 1 UE 1f-02 may transmit a preset RRC message including Preferred STS-GapConfig to the NW1 1f-04 so as to request the NW1 1f-04 for one or more short-time switching gap configurations based on the information received from the USIM 2 UE 1f-03 in operation 1f-30. For example, the preset RRC message may indicate UEAssistanceInformation or a new RRC message. In detail, when at least one condition or some conditions or all conditions are satisfied, in consideration of the conditions below, the USIM 1 UE 1f-02 may transmit the preset RRC message including Preferred STS-GapConfig to the NW1 1f-04.

Condition 1: When a preset RRC message including Preferred STS-GapConfig has never been transmitted after STS-GapPreferenceConfig is configured Condition 2: When current Preferred STS-GapConfig is different from most-recently transmitted Preferred STS-GapConfig Condition 3: When current Preferred STS-GapConfig is different from most-recently transmitted Preferred STS-GapConfig and the new prohibit timer described above in operation 1f-20 is not running Condition 4: When current Preferred STS-GapConfig is different from most-recently configured STS-GapConfig Condition 5: When current Preferred STS-GapConfig is different from most-recently configured STS-GapConfig and the new prohibit timer described above in operation 1f-20 is not running For reference, when the new prohibit timer described above in operation 1f-20 is set, in operation 1f-35, the USIM 1 UE 1f-02 may start or restart a new timer with the new prohibit timer value when the USIM 1 UE 1f-02 transmits the preset RRC message including the Preferred STS-GapConfig to the NW1 1f-04. The Preferred STS-GapConfig may indicate configuration information different from the measurement configuration information (MeasConfig) in the aforementioned embodiment. In detail, one or more Preferred STS-GapConfigs according to an embodiment of the present disclosure may be different from MeasGapConfig of the aforementioned embodiment as below.

Preferred STS-GapConfig is configuration information transmitted from the USIM 1 UE 1f-02 to the NW1 1f-04 for a request.

Preferred STS-GapConfig may include one or more gap patterns according to operations requested in operation 1f-25. For example, a plurality of gap offset values may be included in one long period (mgrp), and switching gap length, switching gap timing advance, and refServCellIndicator mapped to each gap offset may be included. Alternatively, switching gap repetition periodicity, gap offset, switching gap duration, switching gap timing advance, and refServCellIndicator may be included for each gap pattern. Alternatively, a particular gap pattern among the plurality of gap patterns may include an indictor indicating that a gap does not periodically occur but occurs in a one-shot manner or may not include a value of mgrp. Alternatively, the one or more gap patterns may be pre-fixed and thus, a gap pattern index value may be included in Preferred STS-GapConfig. For example, a particular combination of switching gap repetition periodicity, gap offset, switching gap length, switching gap timing advance, and refServCellIndicator may be mapped to gap pattern 1.

Preferred STS-GapConfig may include one or more gap patterns for each FR or each UE, as in MeasGapConfig of the aforementioned embodiment.

Preferred STS-GapConfig may be applied for each band, as in NeedForGapInfoNR of the aforementioned embodiment, and a difference therebetween is that one or more gap patterns may be included for each band.

The USIM 1 UE 1f-02 may request, via Preferred STS-GapConfig, the NW1 1f-04 to release one or more unnecessary gap patterns among one or more configured gap patterns. In the release request, the USIM 1 UE 1f-02 may release one or more gap patterns requested for release, according to a response from the NW1 1f-04, or after the release request, the USIM 1 UE 1f-02 may release one or more gap patterns requested for release without a response from the NW1 1f-04 (e.g., when transmitting a preset RRC message including a request for releasing one or more gap patterns or successfully transmitting the preset RRC message).

In operation 1f-40, as a response to operation 1f-35, the NW1 1f-04 may transmit a preset RRC message including STS-GapConfig, based on the Preferred STS-GapConfig requested by the USIM 1 UE 1f-02. For example, the preset RRC message may indicate RRCReconfiguration or UEInformationRequest or a new RRC message. In detail, the NW1 1f-04 may include allowable (or configurable) information of the received Preferred STS-GapConfig in the STS-GapConfig (obviously, unconfigurable information may also be included in STS-GapConfig) or may vary (as much as delta value) and include some information in STS-GapConfig. The USIM 1 UE 1f-02 may apply the preset RRC message.

In operation 1f-45, as a response to the preset RRC message received in operation 1f-40, the USIM 1 UE 1f-02 may transmit a preset RRC message to the NW1 1*f*-04. The USIM 1 UE 1*f*-02 transmits the preset RRC message to the NW1 1*f*-04 so as to notify the NW1 1*f*-04 that the preset RRC message transmitted from the NW1 1*f*-04 is success-fully received/applied. For example, the preset RRC mes-sage may indicate RRCReconfigurationComplete or UEIn-formationResponse or a new RRC message or the like.

In operation 1*f*-50, the USIM 1 UE 1*f*-02 may determine whether STS-gap occurs, based on STS-GapConfig applied in operation 1*f*-40. For example, STS-gap may be deter-mined as below.

If STS-GapConfig is set to "setup":

If STS-gapConfig is already set up, the USIM 1 UE 1*f*-02 may release STS-gapConfig corresponding thereto;

The USIM 1 UE 1*f*-02 may set up one or more gap patterns indicated in STS-gapConfig received in operation 1*f*-40. In detail, a first subframe where each STS-gap occurs and a SFN have to satisfy the condition 1 below (The SFN may be according to PCell or a cell indicated by a refServCellIndicator).

<Condition 1>

SFN mod T=FLOOR(gapOffset/10);

subframe=gapOffset mod 10;

with T=MGRP/10 as defined in TS 38.133;

The USIM 1 UE 1*f*-02 may apply a switching gap timing advance to a gap that occurs by satisfying the condition. That is, the USIM 1 UE 1*f*-02 may apply a timing advance to a time point of the gap occurring by satisfying the condition, the timing advance being indicated by the switching gap timing advance. For example, the USIM 1 UE 1*f*-02 may start measure-ment earlier than a time point of occurrence of a gap subframe, by the switching gap timing advance.

The constant value 10 may be fixed as a different constant value or may be configured to a particular value by the NW1 1*f*-04 in operation 1*f*-40 or may be configured to a particular value requested by the USIM 1 UE 1*f*-02 in operation 1*f*-35.

The USIM 1 UE 1*f*-02 may release one or more gap patterns released in STS-gapConfig;

In operation 1*f*-50, when STS-gap occurs, in operation 1*f*-55, the USIM 2 UE 1*f*-03 may perform at least one of operations described in operation 1*f*-25. That is, during a switching gap length in the STS-gap occurring in operation 1*f*-50, the USIM 2 UE 1*f*-03 may perform at least one of the operations described in operation 1*f*-25. The USIM 1 UE 1*f*-02 may not perform (or may suspend) data transmission with respect to the NW1 1*f*-04, and as described above, may perform or not perform (or may suspend) data reception, according to Rx capability.

When required thereafter, operation 1*f*-25 to operation 1*f*-55 may be re-performed.

Figure 1G:
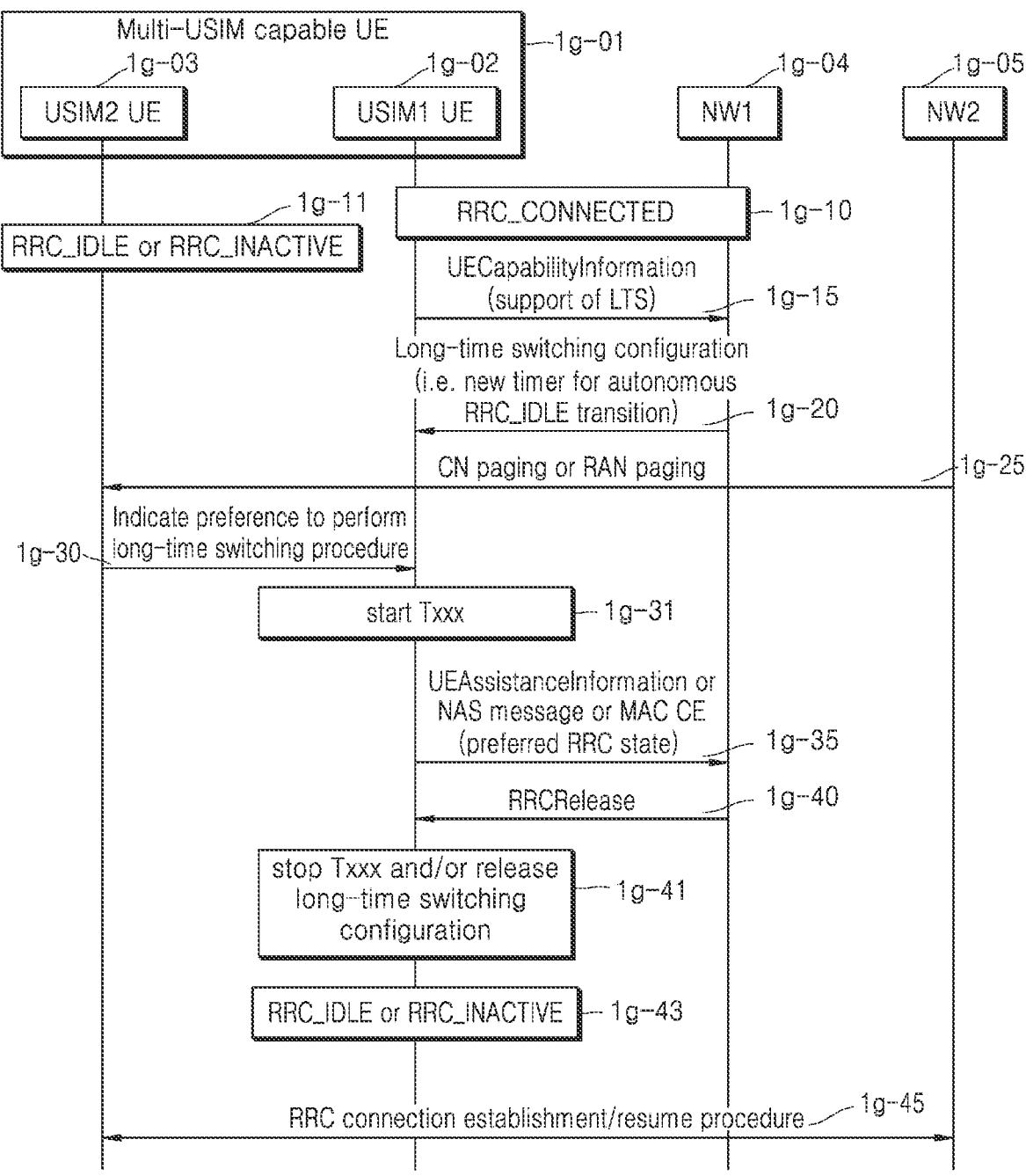
FIG. 1G is a diagram in which a UE supporting multiple USIMs (multi-USIM UE) performs an operation associated with one USIM while the UE leaves an RRC connection mode (RRC_CONNECTED) from a BS associated with another USIM, according to an embodiment of the present disclosure.

FIG. 1G is a diagram in which a UE supporting multiple USIMs (multi-USIM UE) performs an operation associated with one USIM while the UE leaves an RRC connection mode (RRC_CONNECTED) from a BS associated with another USIM, according to an embodiment of the present disclosure.

A multi-USIM UE 1*g*-01 according to an embodiment of the present disclosure may refer to a UE that supports two or more USIMs. For convenience of descriptions, in the present disclosure, a dual-USIM UE that supports two USIMs is considered. The dual-USIM UE may transmit data only to a BS associated with one USIM, in a given time. (It is obvious that data may be simultaneously transmitted to BSs respectively associated with USIMs.) On the other hand, the dual-USIM UE is enabled to receive data from a BS associated with one USIM or simultaneously receive data from BSs respectively associated with USIMs, in a given time.

Referring to FIG. 1G, the multi-USIM UE 1*g*-01 may refer to a UE capable of supporting a plurality of USIMs in one device. For example, the multi-USIM UE may indicate a USIM 1 UE 1*g*-02 when operating with USIM 1 and may indicate a USIM 2 UE 1*g*-03 when operating with USIM 2. A BS may not recognize the multi-USIM as one UE but may recognize a UE for each of multiple USIMs. For example, a NW1 1*g*-04 may recognize the USIM 1 UE 1*g*-02 as one UE, and a NW2 1*g*-05 may recognize the USIM 2 UE 1*g*-03 as one UE. Hereinafter, in embodiments of the present disclosure, for convenience of descriptions, when a multi-USIM UE performs communication by using USIM 1, the multi-USIM UE is referred to as a USIM 1 UE, and when the multi-USIM UE performs communication by using USIM 2, the multi-USIM UE is referred to as a USIM 2 UE. That is, the multi-USIM UE may be the USIM 1 UE or the USIM 2 UE, depending on which USIM among USIM 1 and USIM 2 is used.

In operation 1*g*-10, the USIM 1 UE 1*g*-02 may be in an RRC connection mode (RRC_CONNECTED) by establish-ing RRC connection to the NW1 1*g*-04. In the RRC con-nection mode, the USIM 1 UE 1*g*-02 may transmit and receive data to and from the NW1 1*g*-04.

In operation 1*g*-11, the USIM 2 UE 1*g*-03 may not establish RRC connection to the NW2 1*g*-05, and thus, may be in an RRC idle mode (RRC_IDLE) or an RRC inactive mode (RRC_INACTIVE).

In operation 1*g*-15, the USIM 1 UE 1*g*-02 may transmit a UE capability information message (UECapabilityInfor-mation) to the NW1 1*g*-04. The UE capability information message may include an indicator or an information element indicating that the USIM 1 UE 1*g*-02 supports multiple USIMs. Alternatively, the UE capability information mes-sage may include an indicator indicating that the USIM 1 UE 1*g*-02 prefers to leave an RRC connection mode with respect to the NW1 1*g*-04 (preference to leave RRC_CON-NECTED) or UE capability information indicating informa-tion (e.g., a preferred RRC state) necessary for leaving an RRC connection mode can be transmitted for the USIM 2 UE 1*g*-03 to configure/resume RRC connection to the NW2 1*g*-05 so as transmit and receive data during a long time or a unpredictable time.

Hereinafter, in embodiments of the present disclosure, for convenience of descriptions, a procedure in which the USIM 1 UE 1*h*-02 leaves an RRC connection mode with respect to the NW1 1*h*-04 for the USIM 2 UE 1*h*-03 to transition to an RRC connection mode with respect to the NW2 1*h*-05 so as to transmit and receive data may be referred to as a long-time switching (LTS) procedure. That is, USIM 1 UE capability information included in the UE capability infor-mation message may indicate that the LTS is supported (support of LTS). Obviously, in order to indicate whether the LTS is supported, whether a USIM UE or a BS can be switched for a multi-USIM operation may be included in the UE capability information message, regardless of whether the STS is supported.

In operation 1*g*-20, the NW1 1*g*-04 may configure the USIM 1 UE 1*g*-02 with long-time switching configuration information via a preset RRC message or an NAS message. For example, the preset RRC message may indicate an RRCReconfiguration message including otherConfig. The long-time switching configuration information may include at least one of the followings.

An indicator or an information element indicating, by the NW1 1g-04, whether the USIM 1 UE 1g-02 can perform an LTS procedure A new timer value started by the USIM 1 UE 1g-02 to transition to an RRC idle mode without a response from the NW1. The NW1 1g-04 may set the timer value to be smaller than or equal to or smaller than existing dataInactivity Timer. After the USIM 1 UE 1g-02 starts a new timer with the timer value, when the USIM 1 UE 1g-02 does not receive a preset response message (RRCRelease, RRCReconfiguration, Mobility-FromNRCommand, MAC CE, downlink control information (DCI)) from the NW1 1g-04 until the new timer expires, the USIM 1 UE 1g-02 may transition to an RRC idle mode when the timer expires. When the NW1 1g-04 receives a message transmitted from the USIM 1 UE to leave an RRC connection mode, the NW1 1g-04 may start the timer. This is to solve an RRC state mismatch between the NW1 1g-04 and the USIM 1 UE 1g-02. In the present disclosure, the timer may be referred to as Txxx.

An indicator by which, although the USIM 1 UE 1g-02 has transmitted a preset RRC message, a NAS message, or an MAC CE so as to leave the RRC connection mode, the USIM 1 UE 1g-02 can transmit a message indicating that the USIM 1 UE 1g-02 prefers to cancel the leave and maintain the RRC connection mode.

A prohibit timer value to prevent, after the start of an LTS procedure, an LTS procedure from being re-started during a preset time. When the USIM 1 UE 1g-02 starts a new prohibit timer with the prohibit timer value, the USIM 1 UE 1g-02 cannot re-perform the start of an LTS procedure until the new timer expires. However, in a case where the indicator is configured, by which, although the USIM 1 UE 1g-02 has transmitted a preset RRC message, a NAS message, or an MAC CE so as to leave the RRC connection mode, the USIM 1 UE 1g-02 can transmit a message indicating that the USIM 1 UE 1g-02 prefers to cancel the leave and maintain the RRC connection mode, an LTS procedure may be started even when the prohibit timer is running. The prohibit timer value may be set to a value smaller than or equal to or smaller than a new timer value started for transition to an RRC idle mode without a response from the NW1. This is because, when the USIM 1 UE does not receive a response from the NW1, the USIM 1 UE can re-start an LTS procedure. In the present disclosure, the timer may be referred to as Tyyy.

In operation 1g-25, according to operations described with reference to FIG. 1F, the USIM 2 UE 1g-03 may determine that the USIM 1 UE 1g-02 releases RRC connection to the NW1 1g-04 in a particular STS-gap period, and thus, the USIM 2 UE 1g-03 has to transmit and receive data by configuring or resuming RRC connection to the NW2 1g-05. For example, in operation 1g-25, the USIM 2 UE 1g-03 may receive a paging (CN or RAN) message by monitoring a paging channel transmitted from the NW2 1g-05 during the particular STS-gap period. The paging message includes a USIM 2 UE identifier (ue-Identity) for identifying the USIM 2 UE 1g-03 and/or a cause value (e.g., paging cause indicating voice) for transmitting the paging message, such that the USIM 2 UE 1g-03 may determine to transmit and receive data, in response to the paging message transmitted from the NW2 1g-05.

In operation 1g-30, the USIM 2 UE 1g-03 may provide the USIM 1 UE 1g-02 with an indicator or an information element indicating that the USIM 2 UE 1g-03 desires the USIM 1 UE 1g-02 to release RRC connection to the NW1 1g-04 and attempts to transmit and receive data by configuring or resuming RRC connection to the NW2 1g-05. For example, the USIM 2 UE 1g-03 may transmit, to the USIM 1 UE 1g-02, information about indication of preference to perform an LTS procedure.

In operation 1g-35, the USIM 1 UE 1g-02 may transmit, to the NW1 1g-04, an RRC message or a NAS message including information indicating, for the USIM 2 UE 1g-03, preference to release an RRC connection mode with respect to the NW1 1g-04. The preset RRC message may indicate UEAssistanceInformation, a new RRC message, or the like, and the preset NAS message may indicate Registration Request, a Service Request message, ULInformationTransfer, or the like. The information indicating preference to release the RRC connection mode may indicate at least one of an indicator indicating preference to leave the RRC connection mode, a preferred RRC state (RRC_IDLE or RRC_INACTIVE or preference to RRC_CONNECTED), and paging restriction information. The information indicating preference to release the RRC connection mode may be included and transmitted only in the preset RRC message or may be included and transmitted only in the preset NAS message, or the preset NAS message may be included and transmitted in the preset RRC message.

Obviously, in operation 1g-35, the USIM 1 UE 1g-02 may transmit a MAC CE to the NW1 1g-04. The MAC CE may indicate a MAC CE indicating preference to leave an RRC connection mode or a MAC CE indicating a preferred RRC state.

In operation 1g-31, the USIM 1 UE 1g-02 may start or restart a new timer Txxx with a new timer value started by the USIM 1 UE 1g-02 to transition to an RRC idle mode without a response from the NW1 1g-04 described above in operation 1g-20, and in operation 1g-35, the USIM 1 UE 1g-02 may transmit the preset RRC message, the NAS message, or the MAC CE to the NW1 1g-04.

Alternatively, the USIM 1 UE 1g-02 may start the new timer Txxx when the USIM 1 UE 1g-02 successfully transmits the preset RRC message, the NAS message, or the MAC CE (when an RRC layer receives acknowledgement of success in reception of the message from an RLC or PDCP or MAC layer).

In operation 1g-31, the USIM 1 UE 1g-02 may start the aforementioned new timer Tyyy.

In operation 1g-40, the USIM 1 UE 1g-02 may receive an RRC connection release message (RRCRelease) from the NW1 1g-04.

The present disclosure may propose the USIM 1 UE 1g-02 to stop the new timer Txxx started in operation 1g-31, when receiving the RRC connection release message. For example, in operation 1g-41, the USIM 1 UE 1g-02 may stop the new timer Txxx.

If the new timer Txxx expires as the new timer Txxx is not stopped, the USIM 1 UE 1g-02 transitioned to an RRC idle mode or an RRC inactive mode may have to re-perform an operation to unnecessarily transition to RRC_IDLE (UE actions upon going to RRC_IDLE, section 5.3.11 in TS 38.331). In addition, in a case where the USIM 1 UE 1g-02 has to transition to an RRC idle mode according to the RRC connection release message, in operation 1g-41, the USIM 1 UE may release long-time switching configuration information configured in operation 1g-20.

In operation 1g-43, when the RRC connection release message received in operation 1g-40 includes suspension configuration information (suspendConfig), the USIM 1 UE 1g-02 may transition to an RRC inactive mode, and when the RRC connection release message received in operation 1g-40 does not include suspension configuration information (suspendConfig), the USIM 1 UE 1g-02 may transition to an RRC idle mode.

In operation 1g-45, the USIM 2 UE 1g-03 may transition to the RRC connection mode by performing an RRC connection configuration or RRC connection resume procedure with the NW2 1g-05, and then may transmit and receive data.

Figure 1H:
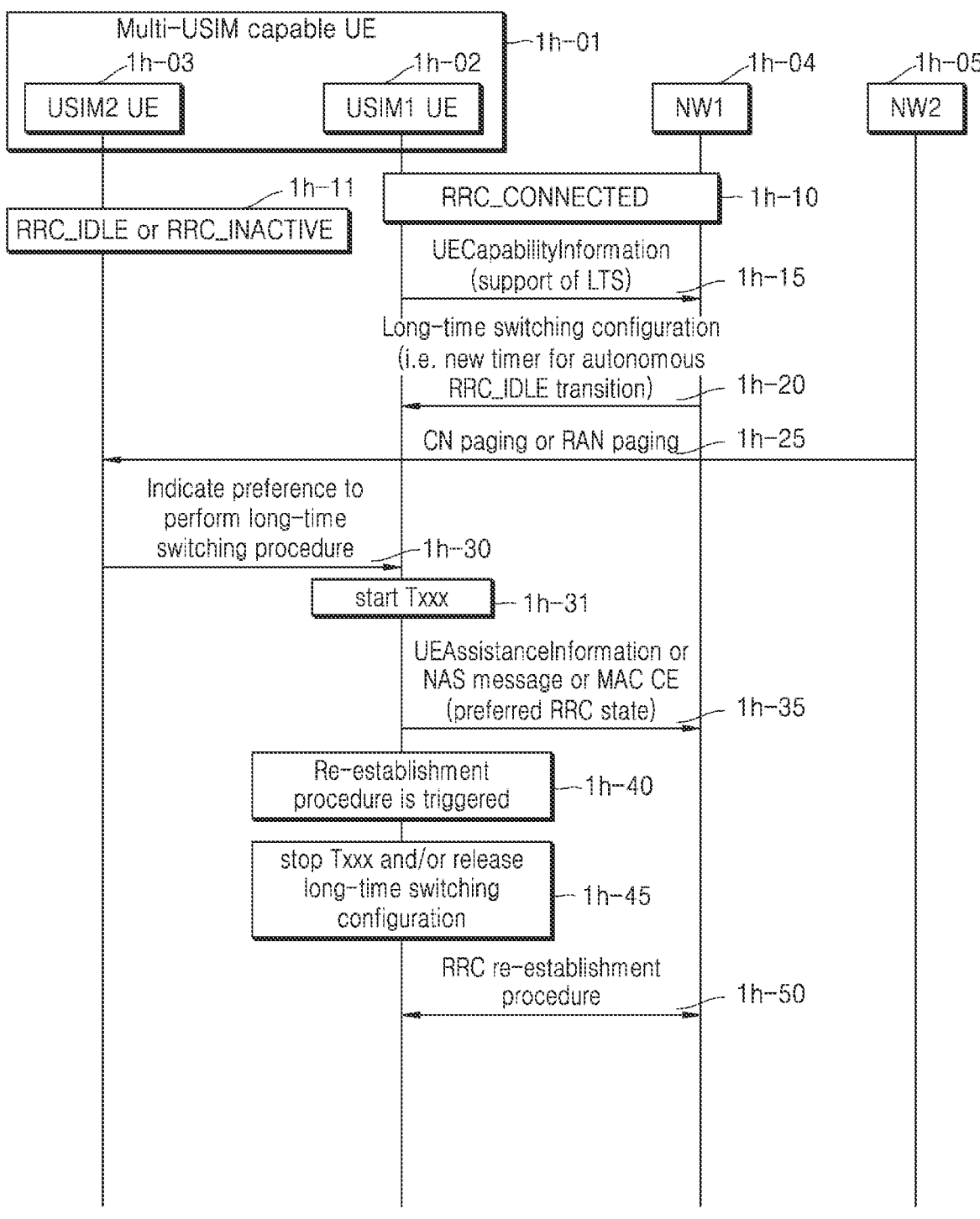
FIG. 1H is a diagram illustrating UE operations when a re-establishment procedure is triggered while a UE supporting multiple USIMs (multi-USIM UE) runs a timer so as to leave an RRC connection mode (RRC_CONNECTED) from a BS associated with one USIM, according to an embodiment of the present disclosure.

FIG. 1H is a diagram illustrating UE operations when a re-establishment procedure is triggered while a UE supporting multiple USIMs (multi-USIM UE) runs a timer so as to leave an RRC connection mode (RRC_CONNECTED) from a BS associated with one USIM, according to an embodiment of the present disclosure.

A multi-USIM UE 1h-01 according to an embodiment of the present disclosure may refer to a UE that supports two or more USIMs. For convenience of descriptions, in the present disclosure, a dual-USIM UE that supports two USIMs is considered. The dual-USIM UE may transmit data only to a BS associated with one USIM, in a given time. (It is obvious that data may be simultaneously transmitted to BSs respectively associated with USIMs.) On the other hand, the dual-USIM UE is enabled to receive data from a BS associated with one USIM or simultaneously receive data from BSs respectively associated with USIMs, in a given time.

Referring to FIG. 1H, the multi-USIM UE 1h-01 may refer to a UE capable of supporting a plurality of USIMs in one device. For example, the multi-USIM UE may indicate a USIM 1 UE 1h-02 when operating with USIM 1 and may indicate a USIM 2 UE 1h-03 when operating with USIM 2. A BS may not recognize the multi-USIM as one UE but may recognize a UE for each of multiple USIMs. For example, a NW1 1h-04 may recognize the USIM 1 UE 1h-02 as one UE, and a NW2 1h-05 may recognize the USIM 2 UE 1h-03 as one UE. Hereinafter, in embodiments of the present disclosure, for convenience of descriptions, when a multi-USIM UE performs communication by using USIM 1, the multi-USIM UE is referred to as a USIM 1 UE, and when the multi-USIM UE performs communication by using USIM 2, the multi-USIM UE is referred to as a USIM 2 UE. That is, the multi-USIM UE may be the USIM 1 UE or the USIM 2 UE, depending on which USIM among USIM 1 and USIM 2 is used.

In operation 1h-10, the USIM 1 UE 1h-02 may be in an RRC connection mode (RRC_CONNECTED) by establishing RRC connection to the NW1 1h-04. In the RRC connection mode, the USIM 1 UE may transmit and receive data to and from the NW1.

In operation 1h-11, the USIM 2 UE 1h-03 may not establish RRC connection to the NW2 1h-05, and thus, may be in an RRC idle mode (RRC_IDLE) or an RRC inactive mode (RRC_INACTIVE).

In operation 1h-15, the USIM 1 UE 1h-02 may transmit a UE capability information message (UECapabilityInformation) to the NW1 1h-04. The UE capability information message may include an indicator or an information element indicating that the USIM 1 UE 1h-02 supports multiple USIMs. Alternatively, the UE capability information message may include an indicator indicating that the USIM 1 UE 1h-02 prefers to leave an RRC connection mode with respect to the NW1 1h-04 (preference to leave RRC_CONNECTED) or UE capability information indicating information (e.g., a preferred RRC state) necessary for leaving an RRC connection mode can be transmitted for the USIM 2

UE 1h-03 to configure/resume RRC connection to the NW2 1h-05 so as transmit and receive data during a long time or a unpredictable time.

Hereinafter, in embodiments of the present disclosure, for convenience of descriptions, a procedure in which the USIM 1 UE 1h-02 leaves an RRC connection mode with respect to the NW1 1h-04 for the USIM 2 UE 1h-03 to transition to an RRC connection mode with respect to the NW2 1h-05 so as to transmit and receive data may be referred to as a long-time switching (LTS) procedure. That is, USIM 1 UE capability information included in the UE capability information message may indicate that the LTS is supported (1h-15). Obviously, in order to indicate whether the LTS is supported, whether a USIM UE or a BS can be switched for a multi-USIM operation may be included in the UE capability information message, regardless of whether the STS is supported.

In operation 1h-20, the NW1 1h-04 may configure the USIM 1 UE 1h-02 with long-time switching configuration information via a preset RRC message or an NAS message. For example, the preset RRC message may indicate an RRCReconfiguration message including otherConfig. The long-time switching configuration information may include at least one of the followings.

An indicator or an information element indicating, by the NW1 1h-04, whether the USIM 1 UE 1h-02 can perform an LTS procedure A new timer value started by the USIM 1 UE 1h-02 to transition to an RRC idle mode without a response from the NW1. The NW1 1h-04 may set the timer value to be smaller than or equal to or smaller than existing dataInactivity Timer. After the USIM 1 UE 1h-02 starts a new timer with the timer value, when the USIM 1 UE 1h-02 does not receive a preset response message (RRCRelease, RRCReconfiguration, MobilityFromNRCommand, MAC CE, DCI) from the NW1 until the new timer expires, the USIM 1 UE 1h-02 may transition to an RRC idle mode when the timer expires. When the NW1 1h-04 receives a message transmitted from the USIM 1 UE 1h-02 to leave an RRC connection mode, the NW1 1h-04 may start the timer. This is to solve an RRC state mismatch between the NW1 1h-04 and the USIM 1 UE 1h-02. In the present disclosure, the timer may be referred to as Txxx.

An indicator by which, although the USIM 1 UE 1h-02 has transmitted a preset RRC message, a NAS message, or an MAC CE so as to leave the RRC connection mode, the USIM 1 UE 1h-02 can transmit a message indicating that the USIM 1 UE 1h-02 prefers to cancel the leave and maintain the RRC connection mode.

A prohibit timer value to prevent, after the start of an LTS procedure, an LTS procedure from being re-started during a preset time. When the USIM 1 UE 1h-02 starts a new prohibit timer with the prohibit timer value, the USIM 1 UE 1h-02 cannot re-perform the start of an LTS procedure until the new timer expires. However, in a case where the indicator is configured, by which, although the USIM 1 UE 1h-02 has transmitted a preset RRC message, a NAS message, or an MAC CE so as to leave the RRC connection mode, the USIM 1 UE 1h-02 can transmit a message indicating that the USIM 1 UE 1h-02 prefers to cancel the leave and maintain the RRC connection mode, an LTS procedure may be started even when the prohibit timer is running. The prohibit timer value may be set to a value smaller than or equal to or smaller than a new timer value started for transition to an RRC idle mode without a response from the NW1. This is because, when the USIM 1 UE does not receive a response from the NW1, the USIM 1 UE can re-start an LTS procedure. In the present disclosure, the timer may be referred to as Tyyy.

In operation 1h-25, according to operations described with reference to FIG. 1F, the USIM 2 UE 1h-03 may determine that the USIM 1 UE 1h-02 releases RRC connection to the NW1 1h-04 in a particular STS-gap period, and thus, the USIM 2 UE 1h-03 has to transmit and receive data by configuring or resuming RRC connection to the NW2 1h-05. For example, in operation 1h-25, the USIM 2 UE 1h-03 may receive a paging (CN or RAN) message by monitoring a paging channel transmitted from the NW2 1h-05 during the particular STS-gap period. The paging message includes a USIM 2 UE identifier (ue-Identity) for identifying the USIM 2 UE 1h-03 and/or a cause value (e.g., paging cause indicating voice) for transmitting the paging message, such that the USIM 2 UE 1h-03 may determine to transmit and receive data, in response to the paging message transmitted from the NW2 1h-05.

In operation 1h-30, the USIM 2 UE 1h-03 may provide the USIM 1 UE 1h-02 with an indicator or an information element indicating that the USIM 2 UE 1h-03 desires the USIM 1 UE 1h-02 to release RRC connection to the NW1 1h-04 and attempts to transmit and receive data by configuring or resuming RRC connection to the NW2 1h-05. For example, the USIM 2 UE 1h-03 may transmit, to the USIM 1 UE 1h-02, information about indication of preference to perform an LTS procedure.

In operation 1h-35, the USIM 1 UE 1h-02 may transmit, to the NW1 1h-04, an RRC message or a NAS message including information indicating, for the USIM 2 UE 1h-03, preference to release an RRC connection mode with respect to the NW1 1g-04. The preset RRC message may indicate UEAssistanceInformation, a new RRC message, or the like, and the preset NAS message may indicate Registration Request, a Service Request message, ULInformationTransfer, or the like. The information indicating preference to release the RRC connection mode may indicate at least one of an indicator indicating preference to leave the RRC connection mode, a preferred RRC state (RRC_IDLE or RRC_INACTIVE or preference to RRC_CONNECTED), and paging restriction information. The information indicating preference to release the RRC connection mode may be included and transmitted only in the preset RRC message or may be included and transmitted only in the preset NAS message, or the preset NAS message may be included and transmitted in the preset RRC message. Obviously, in operation 1h-35, the USIM 1 UE 1h-02 may transmit a MAC CE to the NW1 1h-04. The MAC CE may indicate a MAC CE indicating preference to leave an RRC connection mode or a MAC CE indicating a preferred RRC state.

In operation 1h-31, the USIM 1 UE 1h-02 may start or restart a new timer Txxx with a new timer value started by the USIM 1 UE 1h-02 to transition to an RRC idle mode without a response from the NW1 described above in operation 1h-20, and in operation 1h-35, the preset RRC message, the NAS message, or the MAC CE may be transmitted to the NW1 1h-04.

Alternatively, the USIM 1 UE 1h-02 may start the new timer Txxx when the USIM 1 UE 1h-02 successfully transmits the preset RRC message, the NAS message, or the MAC CE (when an RRC layer receives acknowledgement of success in reception of the message from an RLC or PDCP or MAC layer).

In operation 1h-31, the USIM 1 UE 1h-02 may start the aforementioned new timer Tyyy.

In operation 1h-40, the USIM 1 UE 1h-02 may trigger a re-establishment procedure. Here, the timer Txxx may be running in the USIM 1 UE 1h-02. In detail, when one of conditions below is satisfied, the re-establishment procedure may be triggered.

Condition:

When detecting that a radio link failure of a MCG and t316 is not configured (upon detecting radio link failure of the MCG and t316 is not configured)

When detecting that a radio link failure of the MCG is suspended while SCG transmission is performed (upon detecting radio link failure of the MCG while SCG transmission is suspended)

When detecting a radio link failure while PSCell change is ongoing (upon detecting radio link failure of the MCG while PSCell change is ongoing)

When re-configuration is performed due to a sync failure of the MCG (upon re-configuration with sync failure of the MCG)

In a case of mobility due to NR failure (upon mobility from NR failure

When an integrity check failure is indicated from a lower layer about SRB1 or SRB 2, except a case where an integrity check failure is detected from an RRCReestablishment message (upon integrity check failure indication from lower layers concerning SRB1 or SRB2, except if the integrity check failure is detected on the RRCReestablishment message)

When RRC connection reconfiguration fails (upon an RRC connection reconfiguration failure_

When a radio link failure for the SCG is detected while MCG transmission is suspended in NR-DC or NE-DC (upon detecting radio link failure for the SCG while MCG transmission is suspended in NR-DC or in NE-DC)

When reconfigured due to a sync failure of the SCG while MCG transmission is suspended (upon reconfiguration with sync failure of the SCG while MCG transmission is suspended)

When SCG change fails while MCG transmission is suspended (upon SCG change failure while MCG transmission is suspended)

When SCG configuration fails while MCG transmission is suspended in NR-DC or NE-DC (upon SCG configuration failure while MCG transmission is suspended in NR-DC or NE-DC)

When an integrity check from an SCG lower layer about SRB3 fails while the MCG is suspended (integrity check failure indication from SCG lower layers concerning SRB3 while MCG is suspended)

When T316 expires (upon T316 expiry)

In operation 1h-45, it is proposed that the USIM 1 UE 1h-02 according to an embodiment of the present disclosure stops running Txxx timer (stop Txxx, if running) and/or releases long-time switching configuration information. For example, the USIM 1 UE 1h-02 may stop running Txxx timer or may release long-time switching configuration information.

Then, in operation 1h-50, it is proposed that the USIM 1 UE 1h-02 and the NW1 1h-04 perform an RRC re-establishment procedure. For example, the USIM 1 UE 1h-02 and the NW1 1h-04 may perform an RRC re-establishment procedure. When the operation above is performed, technical advantages below may be obtained.

Advantage 1: The NW1 1h-04 may attempt to rapidly provide the USIM 1 UE 1h-02 with a high priority service (e.g., emergency service). If the USIM 1 UE 1h-02 and the NW1 1h-04 perform operations 1h-45 and 1h-50, the NW1 1h-04 may immediately provide a high priority service to the USIM 1 UE 1h-02 after the RRC re-establishment procedure. Otherwise, a problem may occur, in which the NW1 1h-04 unnecessarily transmits a paging message to the USIM 1 UE 1h-02 at a later time and thus a delay in servicing the high priority service may occur.

Advantage 2: Because the NW1 1h-04 may not be able to receive a preset message transmitted from the USIM 1 UE 1h-02 in operation 1h-35, an RRC state mismatch of a case where the USIM 1 UE 1h-02 and the NW1 1h-04 perform operations 1h-45 and 1h-50 may be prevented. For example, when the USIM 1 UE 1h-02 and the NW1 1h-04 do not perform operations 1h-45 and 1h-50, the NW1 1h-04 may determine that the USIM 1 UE 1h-02 is in an RRC connection state whereas the USIM 1 UE has transitioned to an RRC idle mode, such that an RRC state mismatch may occur. Due to that, the NW1 1h-04 may determine that the USIM 1 UE 1h-02 is in an RRC connection state whereas the USIM 1 UE has transitioned to an RRC idle mode, such that the NW1 1h-04 may consume unnecessary resource for data transmission.

Figure 1I:
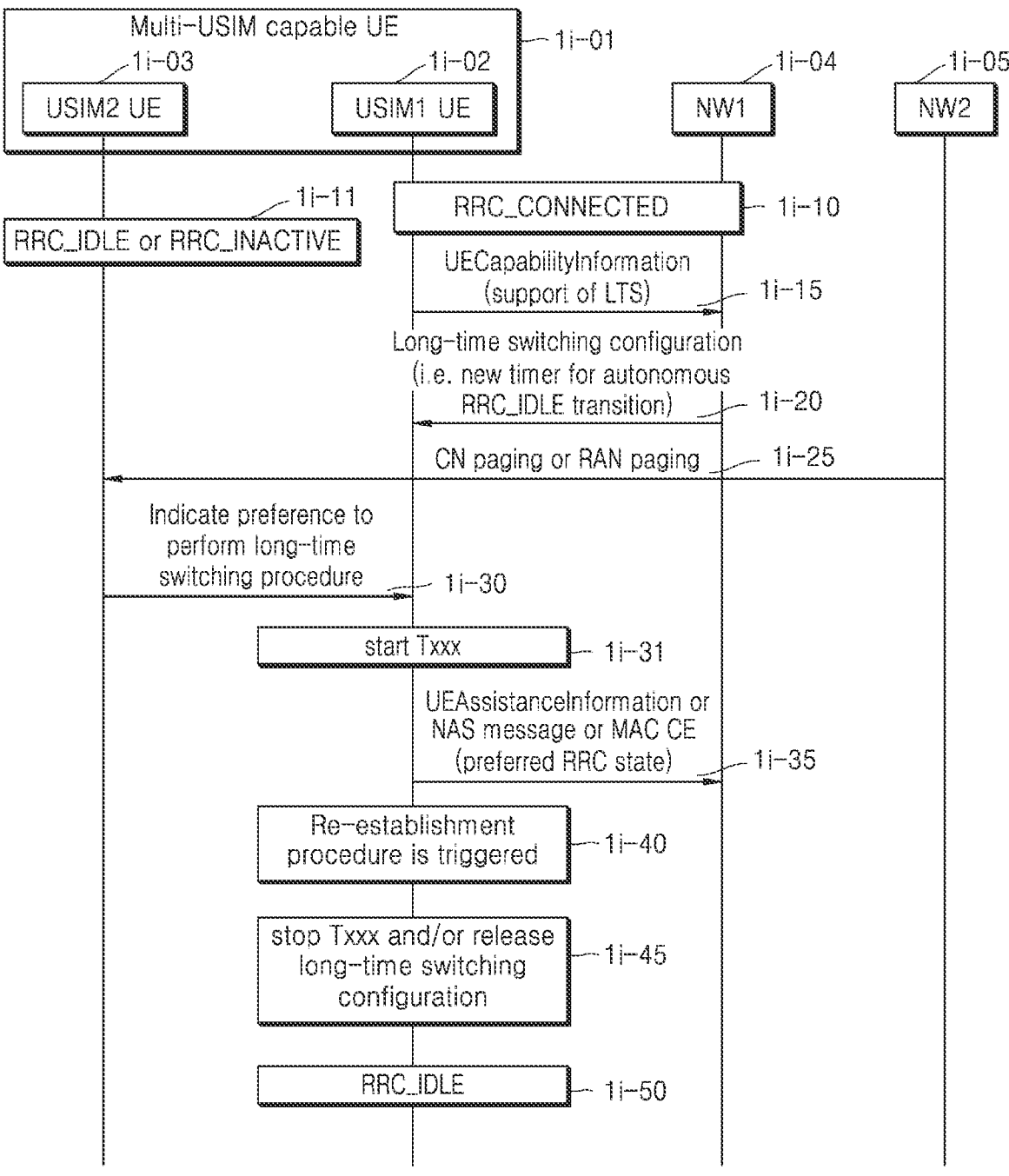
FIG. 1I is a diagram illustrating UE operations when a re-establishment procedure is triggered while a UE supporting multiple USIMs (multi-USIM UE) runs a timer so as to leave an RRC connection mode (RRC_CONNECTED) from a BS associated with one USIM, according to an embodiment of the present disclosure.

FIG. 1I is a diagram illustrating UE operations when a re-establishment procedure is triggered while a UE supporting multiple USIMs (multi-USIM UE) runs a timer so as to leave an RRC connection mode (RRC_CONNECTED) from a BS associated with one USIM, according to an embodiment of the present disclosure.

A multi-USIM UE 1i-01 according to an embodiment of the present disclosure may refer to a UE that supports two or more USIMs. For convenience of descriptions, in the present disclosure, a dual-USIM UE that supports two USIMs is considered. The dual-USIM UE may transmit data only to a BS associated with one USIM, in a given time. (It is obvious that data may be simultaneously transmitted to BSs respectively associated with USIMs.) On the other hand, the dual-USIM UE is enabled to receive data from a BS associated with one USIM or simultaneously receive data from BSs respectively associated with USIMs, in a given time.

Referring to FIG. 1I, the multi-USIM UE 1i-01 may refer to a UE capable of supporting a plurality of USIMs in one device. For example, the multi-USIM UE may indicate a USIM 1 UE 1i-02 when operating with USIM 1 and may indicate a USIM 2 UE 1i-03 when operating with USIM 2. A BS may not recognize the multi-USIM as one UE but may recognize a UE for each of multiple USIMs. For example, a NW1 1i-04 may recognize the USIM 1 UE 1i-02 as one UE, and a NW2 1i-05 may recognize the USIM 2 UE 1i-03 as one UE. Hereinafter, in embodiments of the present disclosure, for convenience of descriptions, when a multi-USIM UE performs communication by using USIM 1, the multi-USIM UE is referred to as a USIM 1 UE, and when the multi-USIM UE performs communication by using USIM 2, the multi-USIM UE is referred to as a USIM 2 UE. That is, the multi-USIM UE may be the USIM 1 UE or the USIM 2 UE, depending on which USIM among USIM 1 and USIM 2 is used.

In operation 1i-10, the USIM 1 UE 1i-02 may be in an RRC connection mode (RRC_CONNECTED) by establishing RRC connection to the NW1 1i-04. In the RRC connection mode, the USIM 1 UE may transmit and receive data to and from the NW1.

In operation 1i-11, the USIM 2 UE 1i-03 may not establish RRC connection to the NW2 1i-05, and thus, may be in an RRC idle mode (RRC_IDLE) or an RRC inactive mode (RRC_INACTIVE).

In operation 1i-15, the USIM 1 UE 1i-02 may transmit a UE capability information message (UECapabilityInformation) to the NW1 1i-04. The UE capability information message may include an indicator or an information element indicating that the USIM 1 UE 1i-02 supports multiple USIMs. Alternatively, the UE capability information message may include an indicator indicating that the USIM 1 UE 1i-02 prefers to leave an RRC connection mode with respect to the NW1 1i-04 (preference to leave RRC_CONNECTED) or UE capability information indicating information (e.g., a preferred RRC state) necessary for leaving an RRC connection mode can be transmitted for the USIM 2 UE 1i-03 to configure/resume RRC connection to the NW2 1i-05 so as to transmit and receive data during a long time or a unpredictable time.

Hereinafter, in embodiments of the present disclosure, for convenience of descriptions, a procedure in which the USIM 1 UE 1i-02 leaves an RRC connection mode with respect to the NW1 1i-04 for the USIM 2 UE 1i-03 to transition to an RRC connection mode with respect to the NW2 1i-05 so as to transmit and receive data may be referred to as a long-time switching (LTS) procedure. That is, USIM 1 UE capability information included in the UE capability information message may indicate that the LTS is supported (1i-15). Obviously, in order to indicate whether the LTS is supported, whether a USIM UE or a BS can be switched for a multi-USIM operation may be included in the UE capability information message, regardless of whether the STS is supported.

In operation 1i-20, the NW1 1i-04 may configure the USIM 1 UE 1i-02 with long-time switching configuration information via a preset RRC message or an NAS message. For example, the preset RRC message may indicate an RRCReconfiguration message including otherConfig. The long-time switching configuration information may include at least one of the followings.

An indicator or an information element indicating, by the NW1 1i-04, whether the USIM 1 UE 1i-02 can perform an LTS procedure A new timer value started by the USIM 1 UE 1i-02 to transition to an RRC idle mode without a response from the NW1. The NW1 1i-04 may set the timer value to be smaller than or equal to or smaller than existing dataInactivityTimer. After the USIM 1 UE 1i-02 starts a new timer with the timer value, when the USIM 1 UE 1i-02 does not receive a preset response message (RRCRelease, RRCReconfiguration, MobilityFromNRCommand, MAC CE, DCI) from the NW1 until the new timer expires, the USIM 1 UE 1i-02 may transition to an RRC idle mode when the timer expires. When the NW1 1i-04 receives a message transmitted from the USIM 1 UE 1i-02 to leave an RRC connection mode, the NW1 1h-04 may start the timer. This is to solve an RRC state mismatch between the NW1 1i-04 and the USIM 1 UE 1i-02. In the present disclosure, the timer may be referred to as Txxx.

An indicator by which, although the USIM 1 UE 1i-02 has transmitted a preset RRC message, a NAS message, or an MAC CE so as to leave the RRC connection mode, the USIM 1 UE 1i-02 can transmit a message indicating that the USIM 1 UE 1i-02 prefers to cancel the leave and maintain the RRC connection mode.

A prohibit timer value to prevent, after the start of an LTS procedure, an LTS procedure from being re-started during a preset time. When the USIM 1 UE 1*i*-02 starts a new prohibit timer with the prohibit timer value, the USIM 1 UE 1*i*-02 cannot re-perform the start of an LTS procedure until the new timer expires. However, in a case where the indicator is configured, by which, although the USIM 1 UE 1*i*-02 has transmitted a preset RRC message, a NAS message, or an MAC CE so as to leave the RRC connection mode, the USIM 1 UE 1*i*-02 can transmit a message indicating that the USIM 1 UE 1*i*-02 prefers to cancel the leave and maintain the RRC connection mode, an LTS procedure may be started even when the prohibit timer is running. The prohibit timer value may be set to a value smaller than or equal to or smaller than a new timer value started for transition to an RRC idle mode without a response from the NW1. This is because, when the USIM 1 UE does not receive a response from the NW1, the USIM 1 UE can re-start an LTS procedure. In the present disclosure, the timer may be referred to as Tyyy.

In operation 1*i*-25, according to operations described with reference to FIG. 1F, the USIM 2 UE 1*i*-03 may determine that the USIM 1 UE 1*i*-02 releases RRC connection to the NW1 1*i*-04 in a particular STS-gap period, and thus, the USIM 2 UE 1*i*-03 has to transmit and receive data by configuring or resuming RRC connection to the NW2 1*i*-05. For example, in operation 1*i*-25, the USIM 2 UE 1*i*-03 may receive a paging (CN or RAN) message by monitoring a paging channel transmitted from the NW2 1*i*-05 during the particular STS-gap period. The paging message includes a USIM 2 UE identifier (ue-Identity) for identifying the USIM 2 UE and/or a cause value (e.g., paging cause indicating voice) for transmitting the paging message, such that the USIM 2 UE 1*i*-03 may determine to transmit and receive data, in response to the paging message transmitted from the NW2 1*i*-05.

In operation 1*i*-30, the USIM 2 UE 1*i*-03 may provide the USIM 1 UE 1*i*-02 with an indicator or an information element indicating that the USIM 2 UE 1*i*-03 desires the USIM 1 UE 1*i*-02 to release RRC connection to the NW1 1*i*-04 and attempts to transmit and receive data by configuring or resuming RRC connection to the NW2 1*i*-05. For example, the USIM 2 UE 1*i*-03 may transmit, to the USIM 1 UE 1*i*-02, information about indication of preference to perform an LTS procedure.

In operation 1*i*-35, the USIM 1 UE 1*i*-02 may transmit, to the NW1 1*i*-04, an RRC message or a NAS message including information indicating, for the USIM 2 UE 1*i*-03, preference to release an RRC connection mode with respect to the NW1 1*i*-04. The preset RRC message may indicate UEAssistanceInformation, a new RRC message, or the like, and the preset NAS message may indicate Registration Request, a Service Request message, ULInformationTransfer, or the like. The information indicating preference to release the RRC connection mode may indicate at least one of an indicator indicating preference to leave the RRC connection mode, a preferred RRC state (RRC_IDLE or RRC_INACTIVE or preference to RRC_CONNECTED), and paging restriction information. The information indicating preference to release the RRC connection mode may be included and transmitted only in the preset RRC message or may be included and transmitted only in the preset NAS message, or the preset NAS message may be included and transmitted in the preset RRC message. Obviously, in operation 1*i*-35, the USIM 1 UE 1*i*-02 may transmit a MAC CE to the NW1 1*i*-04. The MAC CE may indicate a MAC CE indicating preference to leave an RRC connection mode or a MAC CE indicating a preferred RRC state.

In operation 1*i*-31, the USIM 1 UE 1*i*-02 may start or restart a new timer Txxx with a new timer value started by the USIM 1 UE 1*i*-02 to transition to an RRC idle mode without a response from the NW1 described above in operation 1*i*-20, and in operation 1*i*-35, the preset RRC message, the NAS message, or the MAC CE may be transmitted to the NW1 1*i*-04.

Alternatively, the USIM 1 UE 1*i*-02 may start the new timer Txxx when the USIM 1 UE 1*i*-02 successfully transmits the preset RRC message, the NAS message, or the MAC CE (when an RRC layer receives acknowledgement of success in reception of the message from an RLC or PDCP or MAC layer).

In operation 1*i*-31, the USIM 1 UE 1*i*-02 may start the aforementioned new timer Tyyy.

In operation 1*i*-40, the USIM 1 UE 1*i*-02 may trigger a re-establishment procedure. Here, the timer Txxx may be running in the USIM 1 UE.

In detail, when one of conditions below is satisfied, the re-establishment procedure may be triggered.

Condition:

When detecting that a radio link failure of a MCG and t316 is not configured (upon detecting radio link failure of the MCG and t316 is not configured)

When detecting that a radio link failure of the MCG is suspended while SCG transmission is performed (upon detecting radio link failure of the MCG while SCG transmission is suspended)

When detecting a radio link failure while PSCell change is ongoing (upon detecting radio link failure of the MCG while PSCell change is ongoing)

When re-configuration is performed due to a sync failure of the MCG (upon re-configuration with sync failure of the MCG)

In a case of mobility due to NR failure (upon mobility from NR failure

When an integrity check failure is indicated from a lower layer about SRB1 or SRB 2, except a case where an integrity check failure is detected from an RRCReestablishment message (upon integrity check failure indication from lower layers concerning SRB1 or SRB2, except if the integrity check failure is detected on the RRCReestablishment message)

When RRC connection reconfiguration fails (upon an RRC connection reconfiguration failure When a radio link failure for the SCG is detected while MCG transmission is suspended in NR-DC or NE-DC (upon detecting radio link failure for the SCG while MCG transmission is suspended in NR-DC or in NE-DC)

When reconfigured due to a sync failure of the SCG while MCG transmission is suspended (upon reconfiguration with sync failure of the SCG while MCG transmission is suspended)

When SCG change fails while MCG transmission is suspended (upon SCG change failure while MCG transmission is suspended)

When SCG configuration fails while MCG transmission is suspended in NR-DC or NE-DC (upon SCG configuration failure while MCG transmission is suspended in NR-DC or NE-DC)

When an integrity check from an SCG lower layer about SRB3 fails while the MCG is suspended (integrity check failure indication from SCG lower layers concerning SRB3 while MCG is suspended)

When T316 expires (upon T316 expiry) In operation 1*i*-45, it is proposed that the USIM 1 UE 1*i*-02 according to an embodiment of the present disclosure stops running Txxx timer (stop Txxx, if running) and/or releases long-time switching configuration information. For example, the USIM 1 UE 1*i*-02 may stop running Txxx timer or may release long-time switching configuration information.

In operation 1*i*-50, it is proposed that the USIM 1 UE 1*i*-02 transitions to an RRC idle mode. For example, the USIM 1 UE 1*i*-02 may transition to an RRC idle mode. When the operation above is performed, technical advantages below may be obtained.

Advantage 1: The USIM 2 UE 1*i*-03 may transmit and receive data by rapidly performing an RRC connection configuration and resume configuration procedure with respect to the NW2 1*i*-05. The reason why the USIM 1 UE 1*i*-02 performs operation 1*i*-35 is to leave an RRC connection mode with respect to the NW1 1*i*-04 so as to allow the USIM 2 UE 1*i*-03 to transmit and receive data to and from the NW2 1*i*-05, and thus, if a re-establishment is separately performed, data transmission and reception between the USIM 2 UE 1*i*-03 and the NW2 1*i*-05 may be delayed.

Advantage 2: The USIM 1 UE 1*i*-02 may decrease UE power consumption by not performing a re-establishment procedure with respect to the NW1 1*i*-04. For example, when the re-establishment procedure is not performed, the USIM 1 UE 1*i*-02 may not have to transmit an RRCReestablishmentRequest message to the NW1 1*i*-04.

Figure 1J:
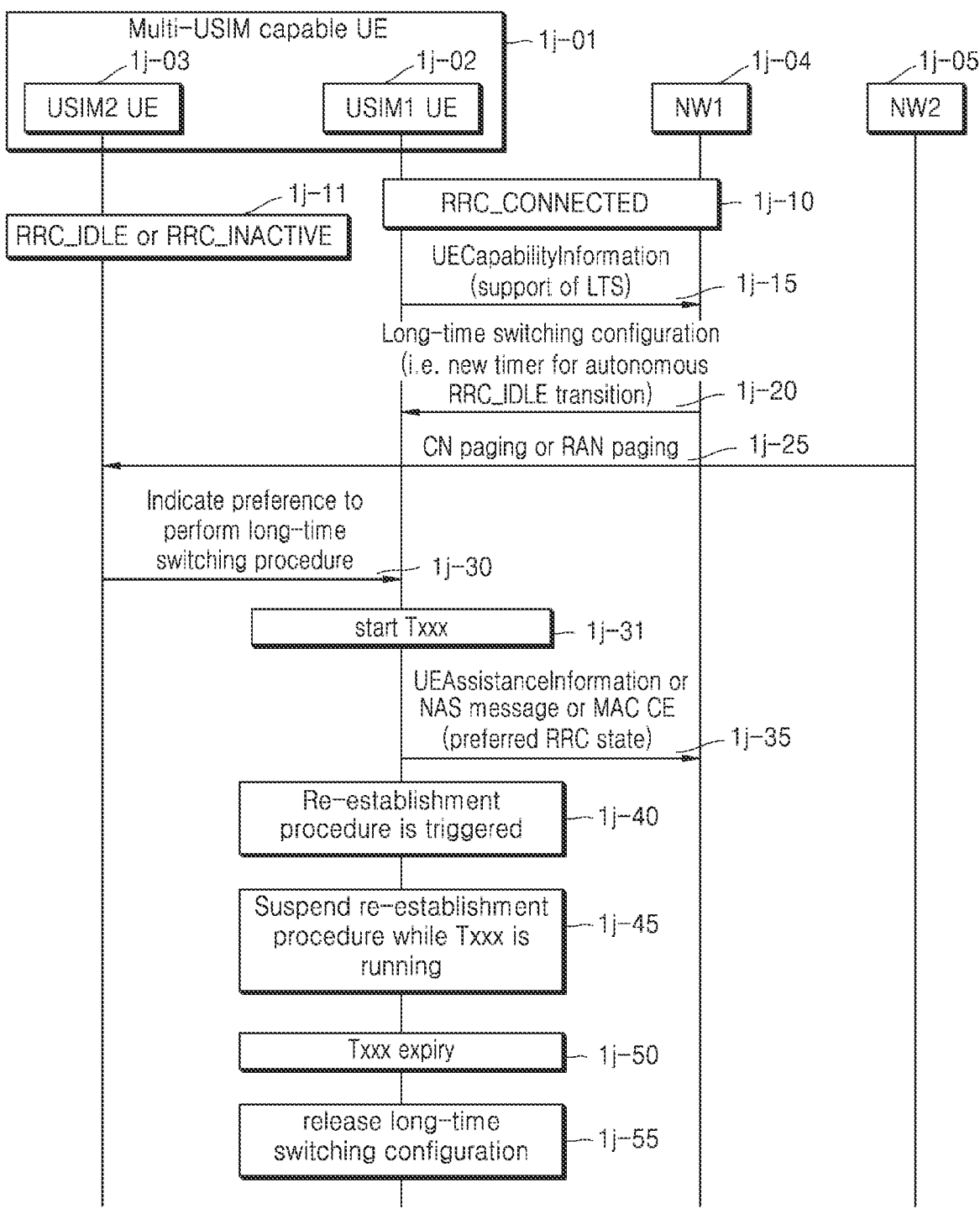
FIG. 1J is a diagram illustrating UE operations when a re-establishment procedure is triggered while a UE supporting multiple USIMs (multi-USIM UE) runs a timer so as to leave an RRC connection mode (RRC_CONNECTED) from a BS associated with one USIM, according to an embodiment of the present disclosure.

FIG. 1J is a diagram illustrating UE operations when a re-establishment procedure is triggered while a UE supporting multiple USIMs (multi-USIM UE) runs a timer so as to leave an RRC connection mode (RRC_CONNECTED) from a BS associated with one USIM, according to an embodiment of the present disclosure.

A multi-USIM UE 1*j*-01 according to an embodiment of the present disclosure may refer to a UE that supports two or more USIMs. For convenience of descriptions, in the present disclosure, a dual-USIM UE that supports two USIMs is considered. The dual-USIM UE may transmit data only to a BS associated with one USIM, in a given time. (It is obvious that data may be simultaneously transmitted to BSs respectively associated with USIMs.) On the other hand, the dual-USIM UE is enabled to receive data from a BS associated with one USIM or simultaneously receive data from BSs respectively associated with USIMs, in a given time.

Referring to FIG. 1J, the multi-USIM UE 1*j*-01 may refer to a UE capable of supporting a plurality of USIMs in one device. For example, the multi-USIM UE may indicate a USIM 1 UE 1*j*-02 when operating with USIM 1 and may indicate a USIM 2 UE 1*j*-03 when operating with USIM 2. A BS may not recognize the multi-USIM as one UE but may recognize a UE for each of multiple USIMs. For example, a NW1 1*j*-04 may recognize the USIM 1 UE 1*j*-02 as one UE, and a NW2 1*j*-05 may recognize the USIM 2 UE 1*j*-03 as one UE. Hereinafter, in embodiments of the present disclosure, for convenience of descriptions, when a multi-USIM UE performs communication by using USIM 1, the multi-USIM UE is referred to as a USIM 1 UE, and when the multi-USIM UE performs communication by using USIM 2, the multi-USIM UE is referred to as a USIM 2 UE. That is, the multi-USIM UE may be the USIM 1 UE or the USIM 2 UE, depending on which USIM among USIM 1 and USIM 2 is used.

In operation 1*j*-10, the USIM 1 UE 1*j*-02 may be in an RRC connection mode (RRC_CONNECTED) by establishing RRC connection to the NW1 1*j*-04. In the RRC connection mode, the USIM 1 UE may transmit and receive data to and from the NW1.

In operation 1*j*-11, the USIM 2 UE 1*j*-03 may not establish RRC connection to the NW2 1*j*-05, and thus, may be in an RRC idle mode (RRC_IDLE) or an RRC inactive mode (RRC_INACTIVE).

In operation 1*j*-15, the USIM 1 UE 1*j*-02 may transmit a UE capability information message (UECapabilityInformation) to the NW1 1*j*-04. The UE capability information message may include an indicator or an information element indicating that the USIM 1 UE 1*j*-02 supports multiple USIMs. Alternatively, the UE capability information message may include an indicator indicating that the USIM 1 UE 1*j*-02 prefers to leave an RRC connection mode with respect to the NW1 1*j*-04 (preference to leave RRC_CONNECTED) or UE capability information indicating information (e.g., a preferred RRC state) necessary for leaving an RRC connection mode can be transmitted for the USIM 2 UE 1*j*-03 to configure/resume RRC connection to the NW2 1*j*-05 so as transmit and receive data during a long time or a unpredictable time.

Hereinafter, in embodiments of the present disclosure, for convenience of descriptions, a procedure in which the USIM 1 UE 1*j*-02 leaves an RRC connection mode with respect to the NW1 1*j*-04 for the USIM 2 UE 1*j*-03 to transition to an RRC connection mode with respect to the NW2 1*j*-05 so as to transmit and receive data may be referred to as a long-time switching (LTS) procedure. That is, USIM 1 UE capability information included in the UE capability information message may indicate that the LTS is supported (1*j*-15). Obviously, in order to indicate whether the LTS is supported, whether a USIM UE or a BS can be switched for a multi-USIM operation may be included in the UE capability information message, regardless of whether the STS is supported.

In operation 1*j*-20, the NW1 1*j*-04 may configure the USIM 1 UE 1*j*-02 with long-time switching configuration information via a preset RRC message or an NAS message. For example, the preset RRC message may indicate an RRCReconfiguration message including otherConfig. The long-time switching configuration information may include at least one of the followings.

An indicator or an information element indicating, by the NW1 1*j*-04, whether the USIM 1 UE 1*j*-02 can perform an LTS procedure A new timer value started by the USIM 1 UE 1*j*-02 to transition to an RRC idle mode without a response from the NW1. The NW1 1*j*-04 may set the timer value to be smaller than or equal to or smaller than existing dataInactivityTimer. After the USIM 1 UE 1*j*-02 starts a new timer with the timer value, when the USIM 1 UE 1*j*-02 does not receive a preset response message (RRCRelease, RRCReconfiguration, MobilityFromNRCommand, MAC CE, DCI) from the NW1 until the new timer expires, the USIM 1 UE 1*j*-02 may transition to an RRC idle mode when the timer expires. When the NW1 1*j*-04 receives a message transmitted from the USIM 1 UE to leave an RRC connection mode, the NW1 1*j*-04 may start the timer. This is to solve an RRC state mismatch between the NW1 1*j*-04 and the USIM 1 UE 1*j*-02. In the present disclosure, the timer may be referred to as Txxx.

An indicator by which, although the USIM 1 UE 1*j*-02 has transmitted a preset RRC message, a NAS message, or an MAC CE so as to leave the RRC connection mode, the USIM 1 UE 1*j*-02 can transmit a message indicating that the USIM 1 UE 1*j*-02 prefers to cancel the leave and maintain the RRC connection mode.

A prohibit timer value to prevent, after the start of an LTS procedure, an LTS procedure from being re-started during a preset time. When the USIM 1 UE 1*j*-02 starts a new prohibit timer with the prohibit timer value, the USIM 1 UE 1*j*-02 cannot re-perform the start of an LTS procedure until the new timer expires. However, in a case where the indicator is configured, by which, although the USIM 1 UE 1*j*-02 has transmitted a preset RRC message, a NAS message, or an MAC CE so as to leave the RRC connection mode, the USIM 1 UE 1*j*-02 can transmit a message indicating that the USIM 1 UE 1*j*-02 prefers to cancel the leave and maintain the RRC connection mode, an LTS procedure may be started even when the prohibit timer is running. The prohibit timer value may be set to a value smaller than or equal to or smaller than a new timer value started for transition to an RRC idle mode without a response from the NW1. This is because, when the USIM 1 UE does not receive a response from the NW1, the USIM 1 UE can re-start an LTS procedure. In the present disclosure, the timer may be referred to as Tyyy.

In operation 1*j*-25, according to operations described with reference to FIG. 1F, the USIM 2 UE 1*j*-03 may determine that the USIM 1 UE 1*j*-02 releases RRC connection to the NW1 1*j*-04 in a particular STS-gap period, and thus, the USIM 2 UE 1*j*-03 has to transmit and receive data by configuring or resuming RRC connection to the NW2 1*j*-05. For example, in operation 1*j*-25, the USIM 2 UE 1*j*-03 may receive a paging (CN or RAN) message by monitoring a paging channel transmitted from the NW2 1*j*-05 during the particular STS-gap period. The paging message includes a USIM 2 UE identifier (ue-Identity) for identifying the USIM 2 UE and/or a cause value (e.g., paging cause indicating voice) for transmitting the paging message, such that the USIM 2 UE 1*j*-03 may determine to transmit and receive data, in response to the paging message transmitted from the NW2 1*j*-05.

In operation 1*j*-30, the USIM 2 UE 1*j*-03 may provide the USIM 1 UE 1*j*-02 with an indicator or an information element indicating that the USIM 2 UE 1*j*-03 desires the USIM 1 UE 1*j*-02 to release RRC connection to the NW1 1*j*-04 and attempts to transmit and receive data by configuring or resuming RRC connection to the NW2 1*j*-05. For example, the USIM 2 UE 1*j*-03 may transmit, to the USIM 1 UE 1*j*-02, information about indication of preference to perform an LTS procedure.

In operation 1*j*-35, the USIM 1 UE 1*j*-02 may transmit, to the NW1 1*j*-04, an RRC message or a NAS message including information indicating, for the USIM 2 UE 1*j*-03, preference to release an RRC connection mode with respect to the NW1 1*j*-04. The preset RRC message may indicate UEAssistanceInformation, a new RRC message, or the like, and the preset NAS message may indicate Registration Request, a Service Request message, ULInformationTransfer, or the like. The information indicating preference to release the RRC connection mode may indicate at least one of an indicator indicating preference to leave the RRC connection mode, a preferred RRC state (RRC_IDLE or RRC_INACTIVE or preference to RRC_CONNECTED), and paging restriction information. The information indicating preference to release the RRC connection mode may be included and transmitted only in the preset RRC message or may be included and transmitted only in the preset NAS message, or the preset NAS message may be included and transmitted in the preset RRC message. Obviously, in operation 1*j*-35, the USIM 1 UE 1*j*-02 may transmit a MAC CE to the NW1 1*j*-04. The MAC CE may indicate a MAC CE indicating preference to leave an RRC connection mode or a MAC CE indicating a preferred RRC state.

In operation 1*j*-31, the USIM 1 UE 1*j*-02 may start or restart a new timer Txxx with a new timer value started by the USIM 1 UE 1*j*-02 to transition to an RRC idle mode without a response from the NW1 described above in operation 1*j*-20, and in operation 1*j*-35, the preset RRC message, the NAS message, or the MAC CE may be transmitted to the NW1 1*j*-04.

Alternatively, the USIM 1 UE 1*j*-02 may start the new timer Txxx when the USIM 1 UE 1*j*-02 successfully transmits the preset RRC message, the NAS message, or the MAC CE (when an RRC layer receives acknowledgement of success in reception of the message from an RLC or PDCP or MAC layer).

In operation 1*j*-31, the USIM 1 UE 1*j*-02 may start the aforementioned new timer Tyyy.

In operation 1*j*-40, the USIM 1 UE 1*j*-02 may trigger a re-establishment procedure. Here, the timer Txxx may be running in the USIM 1 UE.

In detail, when one of conditions below is satisfied, the re-establishment procedure may be triggered.
Condition:

When detecting that a radio link failure of a MCG and t316 is not configured (upon detecting radio link failure of the MCG and t316 is not configured)

When detecting that a radio link failure of the MCG is suspended while SCG transmission is performed (upon detecting radio link failure of the MCG while SCG transmission is suspended)

When detecting a radio link failure while PSCell change is ongoing (upon detecting radio link failure of the MCG while PSCell change is ongoing)

When re-configuration is performed due to a sync failure of the MCG (upon re-configuration with sync failure of the MCG)

In a case of mobility due to NR failure (upon mobility from NR failure

When an integrity check failure is indicated from a lower layer about SRB1 or SRB 2, except a case where an integrity check failure is detected from an RRCReestablishment message (upon integrity check failure indication from lower layers concerning SRB1 or SRB2, except if the integrity check failure is detected on the RRCReestablishment message)

When RRC connection reconfiguration fails (upon an RRC connection reconfiguration failure When a radio link failure for the SCG is detected while MCG transmission is suspended in NR-DC or NE-DC (upon detecting radio link failure for the SCG while MCG transmission is suspended in NR-DC or in NE-DC)

When reconfigured due to a sync failure of the SCG while MCG transmission is suspended (upon reconfiguration with sync failure of the SCG while MCG transmission is suspended)

When SCG change fails while MCG transmission is suspended (upon SCG change failure while MCG transmission is suspended)

When SCG configuration fails while MCG transmission is suspended in NR-DC or NE-DC (upon SCG configuration failure while MCG transmission is suspended in NR-DC or NE-DC)

When an integrity check from an SCG lower layer about SRB3 fails while the MCG is suspended (integrity check failure indication from SCG lower layers concerning SRB3 while MCG is suspended)

When T316 expires (upon T316 expiry) In operation 1*j*-45, it is proposed that the USIM 1 UE 1*j*-02 according to an embodiment of the present disclosure suspends the start of a re-establishment procedure while Txxx timer is running.

That is, when the USIM 1 UE 1*j*-02 does not receive, from the NW1 1*j*-04, a response to a preset message transmitted in operation 1*j*-35, the USIM 1 UE 1*j*-02 may suspend a re-establishment procedure while waiting for the response from the NW1 1*j*-04 until Txxx timer expires. For reference, the NW1 1*j*-04 may configure whether the USIM 1 UE 1*j*-02 is to suspend a re-establishment procedure, by a preset RRC message transmitted in operation 1*j*-20.

If Txxx timer expires in operation 1*j*-50, the USIM 1 UE 1*j*-02 may release long-time switching configuration information and perform a re-establishment procedure with respect to the NW1 1*j*-04, as in the aforementioned embodiment.

Alternatively, if Txxx timer expires in operation 1*j*-50, the USIM 1 UE 1*j*-02 may not release long-time switching configuration information and may not start a re-establishment procedure but may transition to an RRC idle mode in operation 1*j*-55, as in the embodiment described above with reference to FIG. 1I. When the USIM 1 UE 1*j*-02 suspends the re-establishment procedure while waiting for the response from the NW1 1*j*-04 until Txxx timer expires, technical advantages below may be obtained.

Advantage 1: The NW1 1*j*-04 may perform scheduling to the USIM 1 UE 1*j*-02 until Txxx expires. For example, until Txxx timer expires, the NW1 1*j*-04 may provide a necessary service to the USIM 1 UE 1*j*-02.

Advantage 2: The NW1 1*j*-04 may have final authority on a long-time switching procedure. For example, because the NW1 1*j*-04 can transmit, to the USIM 1 UE 1*j*-02, a preset RRC message such as RRCRelease, RRCReconfiguration, MobilityFromNRCommand, and the like, in response to operation 1*j*-35, until Txxx timer expires, the NW1 1*j*-04 may determine whether the USIM 1 UE 1*j*-02 is to change an RRC state, to perform handover, or to cancel a long-time switching procedure and continuously perform data transmission and reception to and from the NW1 1*j*-04.

Figure 1K:
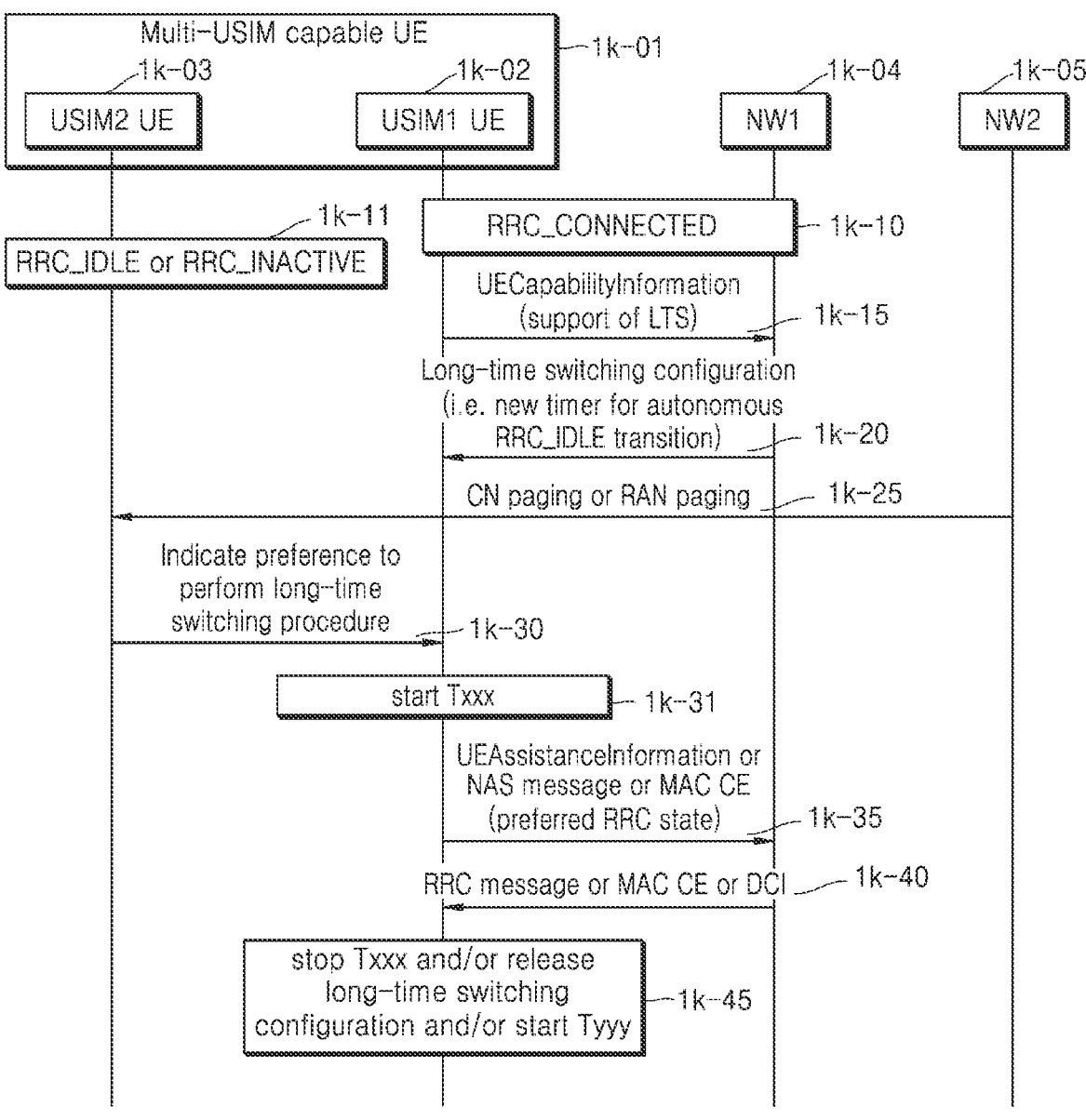
FIG. 1K is a diagram illustrating operations of a UE and a BS according to a procedure in which a UE supporting multiple USIMs (multi-USIM UE) leaves an RRC connection mode (RRC_CONNECTED) from a BS associated with one USIM, according to an embodiment of the present disclosure.

FIG. 1K is a diagram illustrating operations of a UE and a BS according to a procedure in which a UE supporting multiple USIMs (multi-USIM UE) leaves an RRC connection mode (RRC_CONNECTED) from a BS associated with one USIM, according to an embodiment of the present disclosure.

A multi-USIM UE 1*k*-01 according to an embodiment of the present disclosure may refer to a UE that supports two or more USIMs. For convenience of descriptions, in the present disclosure, a dual-USIM UE that supports two USIMs is considered. The dual-USIM UE may transmit data only to a BS associated with one USIM, in a given time. (It is obvious that data may be simultaneously transmitted to BSs respectively associated with USIMs.) On the other hand, the dual-USIM UE is enabled to receive data from a BS associated with one USIM or simultaneously receive data from BSs respectively associated with USIMs, in a given time.

Referring to FIG. 1K, the multi-USIM UE 1*k*-01 may refer to a UE capable of supporting a plurality of USIMs in one device. For example, the multi-USIM UE may indicate a USIM 1 UE 1*k*-02 when operating with USIM 1 and may indicate a USIM 2 UE 1*k*-03 when operating with USIM 2. A BS may not recognize the multi-USIM as one UE but may recognize a UE for each of multiple USIMs. For example, a NW1 1*k*-04 may recognize the USIM 1 UE 1*k*-02 as one UE, and a NW2 1*k*-05 may recognize the USIM 2 UE 1*k*-03 as one UE. Hereinafter, in embodiments of the present disclosure, for convenience of descriptions, when a multi-USIM UE performs communication by using USIM 1, the multi-USIM UE is referred to as a USIM 1 UE, and when the multi-USIM UE performs communication by using USIM 2, the multi-USIM UE is referred to as a USIM 2 UE. That is, the multi-USIM UE may be the USIM 1 UE or the USIM 2 UE, depending on which USIM among USIM 1 and USIM 2 is used.

In operation 1*k*-10, the USIM 1 UE 1*k*-02 may be in an RRC connection mode (RRC_CONNECTED) by establishing RRC connection to the NW1 1*k*-04. In the RRC connection mode, the USIM 1 UE may transmit and receive data to and from the NW1.

In operation 1*k*-11, the USIM 2 UE 1*k*-03 may not establish RRC connection to the NW2 1*k*-05, and thus, may be in an RRC idle mode (RRC_IDLE) or an RRC inactive mode (RRC_INACTIVE).

In operation 1*k*-15, the USIM 1 UE 1*k*-02 may transmit a UE capability information message (UECapabilityInformation) to the NW1 1*k*-04. The UE capability information message may include an indicator or an information element indicating that the USIM 1 UE 1*k*-02 supports multiple USIMs. Alternatively, the UE capability information message may include an indicator indicating that the USIM 1 UE 1*k*-02 prefers to leave an RRC connection mode with respect to the NW1 1*k*-04 (preference to leave RRC_CONNECTED) or UE capability information indicating information (e.g., a preferred RRC state) necessary for leaving an RRC connection mode can be transmitted for the USIM 2 UE 1*k*-03 to configure/resume RRC connection to the NW2 1*k*-05 so as transmit and receive data during a long time or a unpredictable time.

Hereinafter, in embodiments of the present disclosure, for convenience of descriptions, a procedure in which the USIM 1 UE 1*k*-02 leaves an RRC connection mode with respect to the NW1 1*k*-04 for the USIM 2 UE 1*k*-03 to transition to an RRC connection mode with respect to the NW2 1*k*-05 so as to transmit and receive data may be referred to as a long-time switching (LTS) procedure. That is, USIM 1 UE capability information included in the UE capability information message may indicate that the LTS is supported (1*k*-15). Obviously, in order to indicate whether the LTS is supported, whether a USIM UE or a BS can be switched for a multi-USIM operation may be included in the UE capability information message, regardless of whether the STS is supported.

In operation 1*k*-20, the NW1 1*k*-04 may configure the USIM 1 UE 1*k*-02 with long-time switching configuration information via a preset RRC message or an NAS message. For example, the preset RRC message may indicate an RRCReconfiguration message including otherConfig. The long-time switching configuration information may include at least one of the followings.

An indicator or an information element indicating, by the NW1 1*k*-04, whether the USIM 1 UE 1*k*-02 can perform an LTS procedure A new timer value started by the USIM 1 UE 1*k*-02 to transition to an RRC idle mode without a response from the NW1. The NW1 1*k*-04 may set the timer value to be smaller than or equal to or smaller than existing dataInactivity Timer. After the USIM 1 UE starts a new timer with the timer value, when the USIM 1 UE does not receive a preset response message (RRCRelease, RRCReconfiguration, MobilityFromNRCommand, MAC CE, DCI) from the NW1 until the new timer expires, the USIM 1 UE 1*k*-02 may transition to an RRC idle mode when the timer expires. When the NW1 1*k*-04 receives a message transmitted from the USIM 1 UE 1*k*-02 to leave an RRC connection mode, the NW1 1*k*-04 may start the timer. This is to solve an RRC state mismatch between the NW1 1*k*-04 and the USIM 1 UE 1*k*-02. In the present disclosure, the timer may be referred to as Txxx.

An indicator by which, although the USIM 1 UE 1*k*-02 has transmitted a preset RRC message, a NAS message, or an MAC CE so as to leave the RRC connection mode, the USIM 1 UE 1*k*-02 can transmit a message indicating that the USIM 1 UE 1*k*-02 prefers to cancel the leave and maintain the RRC connection mode.

A prohibit timer value to prevent, after the start of an LTS procedure, an LTS procedure from being re-started during a preset time. When the USIM 1 UE 1*k*-02 starts a new prohibit timer with the prohibit timer value, the USIM 1 UE 1*k*-02 cannot re-perform the start of an LTS procedure until the new timer expires. However, in a case where the indicator is configured, by which, although the USIM 1 UE 1*k*-02 has transmitted a preset RRC message, a NAS message, or an MAC CE so as to leave the RRC connection mode, the USIM 1 UE 1*k*-02 can transmit a message indicating that the USIM 1 UE 1*k*-02 prefers to cancel the leave and maintain the RRC connection mode, an LTS procedure may be started even when the prohibit timer is running. The prohibit timer value may be set to a value smaller than or equal to or smaller than a new timer value started for transition to an RRC idle mode without a response from the NW1. This is because, when the USIM 1 UE does not receive a response from the NW1, the USIM 1 UE can re-start an LTS procedure. In the present disclosure, the timer may be referred to as Tyyy.

In operation 1*k*-25, according to operations described with reference to FIG. 1F, the USIM 2 UE 1*k*-03 may determine that the USIM 1 UE 1*k*-02 releases RRC connection to the NW1 1*k*-04 in a particular STS-gap period, and thus, the USIM 2 UE 1*k*-03 has to transmit and receive data by configuring or resuming RRC connection to the NW2 1*k*-05. For example, in operation 1*k*-25, the USIM 2 UE 1*k*-03 may receive a paging (CN or RAN) message by monitoring a paging channel transmitted from the NW2 1*k*-05 during the particular STS-gap period. The paging message includes a USIM 2 UE identifier (ue-Identity) for identifying the USIM 2 UE 1*k*-03 and/or a cause value (e.g., paging cause indicating voice) for transmitting the paging message, such that the USIM 2 UE 1*k*-03 may determine to transmit and receive data, in response to the paging message transmitted from the NW2 1*k*-05.

In operation 1*k*-30, the USIM 2 UE 1*k*-03 may provide the USIM 1 UE 1*k*-02 with an indicator or an information element indicating that the USIM 2 UE 1*k*-03 desires the USIM 1 UE 1*k*-02 to release RRC connection to the NW1 1*k*-04 and attempts to transmit and receive data by configuring or resuming RRC connection to the NW2 1*k*-05. For example, the USIM 2 UE 1*k*-03 may transmit, to the USIM 1 UE 1*k*-02, information about indication of preference to perform an LTS procedure.

In operation 1*k*-35, the USIM 1 UE 1*k*-02 may transmit, to the NW1 1*k*-04, an RRC message or a NAS message including information indicating, for the USIM 2 UE 1*k*-03, preference to release an RRC connection mode with respect to the NW1 1*k*-04. The preset RRC message may indicate UEAssistanceInformation, a new RRC message, or the like, and the preset NAS message may indicate Registration Request, a Service Request message, ULInformationTransfer, or the like. The information indicating preference to release the RRC connection mode may indicate at least one of an indicator indicating preference to leave the RRC connection mode, a preferred RRC state (RRC_IDLE or RRC_INACTIVE or preference to RRC_CONNECTED), and paging restriction information. The information indicating preference to release the RRC connection mode may be included and transmitted only in the preset RRC message or may be included and transmitted only in the preset NAS message, or the preset NAS message may be included and transmitted in the preset RRC message. Obviously, in operation 1*k*-35, the USIM 1 UE 1*k*-02 may transmit a MAC CE to the NW1 1*k*-04. The MAC CE may indicate a MAC CE indicating preference to leave an RRC connection mode or a MAC CE indicating a preferred RRC state.

In operation 1*k*-31, the USIM 1 UE 1*k*-02 may start or restart a new timer Txxx with a new timer value started by the USIM 1 UE 1*k*-02 to transition to an RRC idle mode without a response from the NW1 described above in operation 1*k*-20, and in operation 1*k*-35, the preset RRC message, the NAS message, or the MAC CE may be transmitted to the NW1 1*k*-04.

Alternatively, the USIM 1 UE 1*k*-02 may start the new timer Txxx when the USIM 1 UE 1*k*-02 successfully transmits the preset RRC message, the NAS message, or the MAC CE (when an RRC layer receives acknowledgement of success in reception of the message from an RLC or PDCP or MAC layer).

In operation 1*k*-31, the USIM 1 UE 1*k*-02 may start the aforementioned new timer Tyyy.

In operation 1*k*-40, the NW1 1*k*-04 may transmit a preset RRC message, not an RRCRelease message, to the USIM 1 UE 1*k*-02. For example, according to the present disclosure, the NW1 1*k*-04 may transmit one RRC message among RRCReconfiguration or MobilityFromNRCommand or DLInformation TransferMRDC to the USIM 1 UE 1*k*-02. The NW1 1*k*-04 may implicitly cancel a long-time switching procedure by transmitting the preset RRC message to the USIM 1 UE 1*k*-02, the long-time switching procedure having been started by the USIM 1 UE 1*k*-02. For example, a safety service or voice service with high priority is triggered by the NW1 1*k*-04, such that the NW1 1*k*-04 may transmit an RRCReconfiguration message to the USIM 1 UE 1*k*-02 so as to allow the USIM 1 UE 1*k*-02 to transmit and receive data by continuously maintaining an RRC connection state. The RRCReconfiguration may include an HO command (e.g., reconfigurationWithySync).

In operation 1*k*-45, the USIM 1 UE 1*k*-02 may stop running Txxx timer (stop Txxx, if running), and/or may release long-time switching configuration information. In detail, when the USIM 1 UE 1*k*-02 starts or performs a RRCReconfiguration or MobilityFromNRCommand or DLInformation TransferMRDC procedure according to the preset RRC message received in operation 1*k*-40, the USIM 1 UE 1*k*-02 may stop running Txxx timer (stop Txxx, if running) and/or may release long-time switching configuration information.

As described above, in operation 1*k*-40, the NW1 1*k*-04 may transmit the preset RRC message, not an RRCRelease message, to the USIM 1 UE 1*k*-02. For example, according to the present disclosure, the NW1 1*k*-04 may transmit one RRC message among RRCReconfiguration or Mobility FromNRCommand or DLInformation TransferMRDC to the USIM 1 UE 1*k*-02.

According to the present disclosure, it is proposed that the preset RRC message includes an indicator that explicitly indicates cancellation of the long-time switching procedure started by the USIM 1 UE 1*k*-02. For example, a safety service or voice service with high priority is triggered by the NW1 1*k*-04, such that the NW1 1*k*-04 may transmit the preset RRC message to the USIM 1 UE 1*k*-02 so as to allow the USIM 1 UE to transmit and receive data by continuously maintaining an RRC connection state, the preset RRC message including the indicator explicitly indicating cancellation of the long-time switching procedure. The USIM 1 UE 1*k*-02 may stop running Txxx timer (stop Txxx, if running).

In operation 1*k*-45, the USIM 1 UE 1*k*-02 may stop running Txxx timer (stop Txxx, if running). Then, Tyyy timer may be started. Alternatively, the Tyyy timer may be started in operation 1*k*-31. When Tyyy timer expires, the USIM 1 UE 1*k*-02 may perform operation 1*k*-35 described above.

In operation 1*k*-40, the NW1 1*k*-04 may transmit a MAC CE or DCI, not an RRCRelease message, to the USIM 1 UE 1*k*-02. According to the present disclosure, it is proposed that cancellation of the long-time switching procedure started by the USIM 1 UE 1*k*-02 is explicitly indicated by the preset MAC CE or the DCI. In operation 1*k*-45, the USIM 1 UE 1*k*-02 may stop running Txxx timer (stop Txxx, if running). Then, Tyyy timer may be started. Alternatively, the Tyyy timer may be started in operation 1*k*-31. When Tyyy timer expires, the USIM 1 UE 1*k*-02 may perform operation 1*k*-35 described above.

Figure 1L:
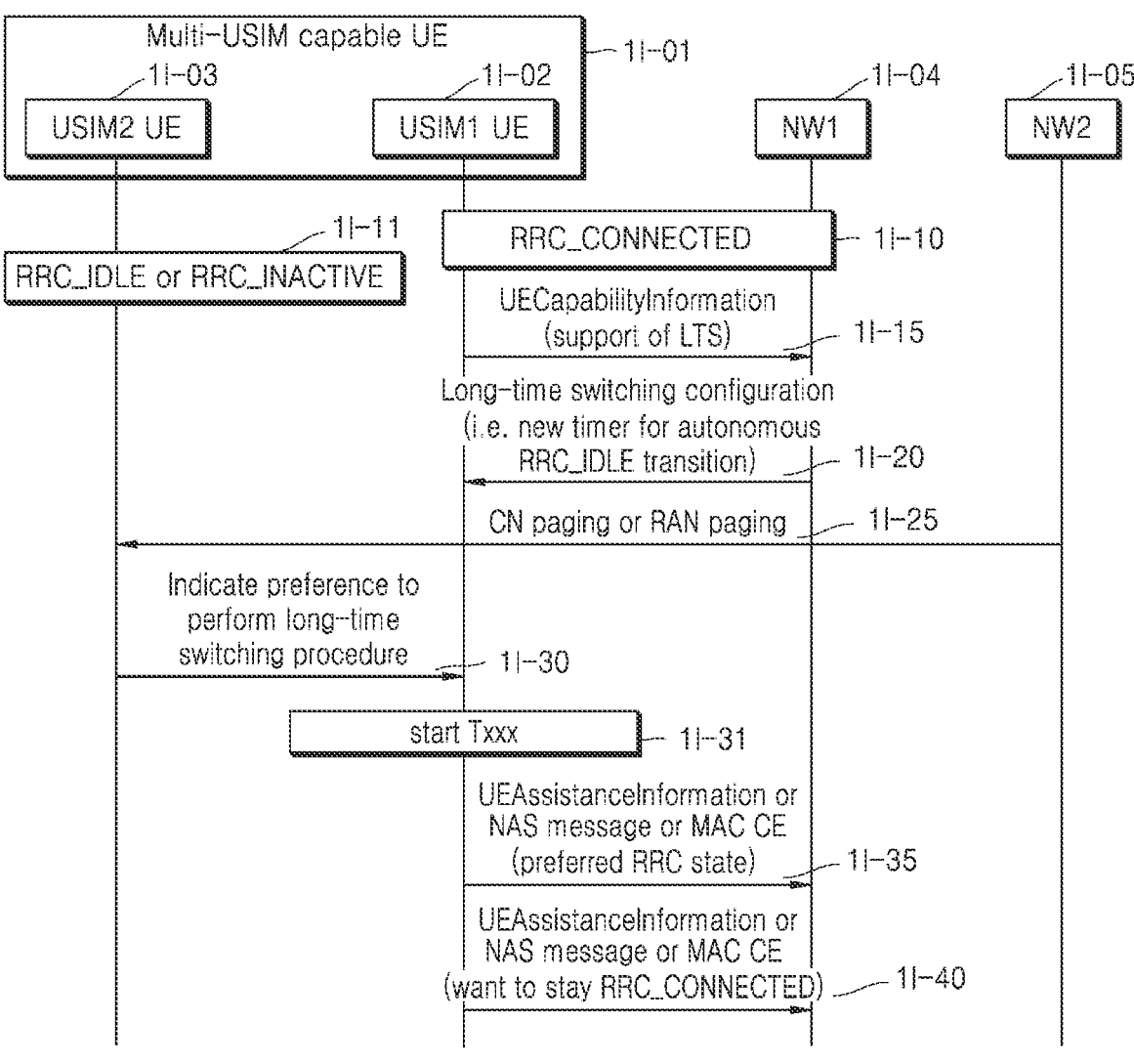
FIG. 1L is a diagram illustrating operations of a UE and a BS according to a procedure in which a UE supporting multiple USIMs (multi-USIM UE) leaves an RRC connection mode (RRC_CONNECTED) from a BS associated with one USIM, according to an embodiment of the present disclosure.

FIG. 1L is a diagram illustrating operations of a UE and a BS according to a procedure in which a UE supporting multiple USIMs (multi-USIM UE) leaves an RRC connection mode (RRC_CONNECTED) from a BS associated with one USIM, according to an embodiment of the present disclosure.

A multi-USIM UE 1*l*-01 according to an embodiment of the present disclosure may refer to a UE that supports two or more USIMs. For convenience of descriptions, in the present disclosure, a dual-USIM UE that supports two USIMs is considered. The dual-USIM UE may transmit data only to a BS associated with one USIM, in a given time. (It is obvious that data may be simultaneously transmitted to BSs respectively associated with USIMs.) On the other hand, the dual-USIM UE is enabled to receive data from a BS associated with one USIM or simultaneously receive data from BSs respectively associated with USIMs, in a given time.

Referring to FIG. 1L, the multi-USIM UE 1*l*-01 may refer to a UE capable of supporting a plurality of USIMs in one device. For example, the multi-USIM UE may indicate a USIM 1 UE 1*l*-02 when operating with USIM 1 and may indicate a USIM 2 UE 1*l*-03 when operating with USIM 2. A BS may not recognize the multi-USIM as one UE but may recognize a UE for each of multiple USIMs. For example, a NW1 1*l*-04 may recognize the USIM 1 UE 1*l*-02 as one UE, and a NW2 1*l*-05 may recognize the USIM 2 UE 1*l*-03 as one UE.

Hereinafter, in embodiments of the present disclosure, for convenience of descriptions, when a multi-USIM UE performs communication by using USIM 1, the multi-USIM UE is referred to as a USIM 1 UE, and when the multi-USIM UE performs communication by using USIM 2, the multi-USIM UE is referred to as a USIM 2 UE. That is, the multi-USIM UE may be the USIM 1 UE or the USIM 2 UE, depending on which USIM among USIM 1 and USIM 2 is used.

In operation 1*l*-10, the USIM 1 UE 1*l*-02 may be in an RRC connection mode (RRC_CONNECTED) by establishing RRC connection to the NW1 1*l*-04. In the RRC connection mode, the USIM 1 UE may transmit and receive data to and from the NW1.

In operation 1*l*-11, the USIM 2 UE 1*l*-03 may not establish RRC connection to the NW2 1*l*-05, and thus, may be in an RRC idle mode (RRC_IDLE) or an RRC inactive mode (RRC_INACTIVE).

In operation 1*l*-15, the USIM 1 UE 1*l*-02 may transmit a UE capability information message (UECapabilityInformation) to the NW1 1*l*-04. The UE capability information message may include an indicator or an information element indicating that the USIM 1 UE 1*l*-02 supports multiple USIMs. Alternatively, the UE capability information message may include an indicator indicating that the USIM 1 UE 1*l*-02 prefers to leave an RRC connection mode with respect to the NW1 1*l*-04 (preference to leave RRC_CONNECTED) or UE capability information indicating information (e.g., a preferred RRC state) necessary for leaving an RRC connection mode can be transmitted for the USIM 2 UE 1*l*-03 to configure/resume RRC connection to the NW2 1*l*-05 so as transmit and receive data during a long time or a unpredictable time.

Hereinafter, in embodiments of the present disclosure, for convenience of descriptions, a procedure in which the USIM 1 UE 1*l*-02 leaves an RRC connection mode with respect to the NW1 1*l*-04 for the USIM 2 UE 1*l*-03 to transition to an RRC connection mode with respect to the NW2 1*l*-05 so as to transmit and receive data may be referred to as a long-time switching (LTS) procedure. That is, USIM 1 UE capability information included in the UE capability information message may indicate that the LTS is supported (1*l*-15). Obviously, in order to indicate whether the LTS is supported, whether a USIM UE or a BS can be switched for a multi-USIM operation may be included in the UE capability information message, regardless of whether the STS is supported.

In operation 1*l*-20, the NW1 1*l*-04 may configure the USIM 1 UE 1*l*-02 with long-time switching configuration information via a preset RRC message or an NAS message. For example, the preset RRC message may indicate an RRCReconfiguration message including otherConfig. The long-time switching configuration information may include at least one of the followings.

An indicator or an information element indicating, by the NW1 1*l*-04, whether the USIM 1 UE 1*l*-02 can perform an LTS procedure A new timer value started by the USIM 1 UE 1*l*-02 to transition to an RRC idle mode without a response from the NW1. The NW1 1*l*-04 may set the timer value to be smaller than or equal to or smaller than existing dataInactivity Timer. After the USIM 1 UE starts a new timer with the timer value, when the USIM 1 UE does not receive a preset response message (RRCRelease, RRCReconfiguration, MobilityFromNRCommand, MAC CE, DCI) from the NW1 until the new timer expires, the USIM 1 UE 1*l*-02 may transition to an RRC idle mode when the timer expires. When the NW1 1*l*-04 receives a message transmitted from the USIM 1 UE to leave an RRC connection mode, the NW1 1*l*-04 may start the timer. This is to solve an RRC state mismatch between the NW1 1*l*-04 and the USIM 1 UE 1*l*-02. In the present disclosure, the timer may be referred to as Txxx.

An indicator by which, although the USIM 1 UE 1*l*-02 has transmitted a preset RRC message, a NAS message, or an MAC CE so as to leave the RRC connection mode, the USIM 1 UE 1*l*-02 can transmit a message indicating that the USIM 1 UE 1*l*-02 prefers to cancel the leave and maintain the RRC connection mode.

A prohibit timer value to prevent, after the start of an LTS procedure, an LTS procedure from being re-started during a preset time. When the USIM 1 UE 1*l*-02 starts a new prohibit timer with the prohibit timer value, the USIM 1 UE 1*l*-02 cannot re-perform the start of an LTS procedure until the new timer expires. However, in a case where the indicator is configured, by which, although the USIM 1 UE 1*l*-02 has transmitted a preset RRC message, a NAS message, or an MAC CE so as to leave the RRC connection mode, the USIM 1 UE 1*l*-02 can transmit a message indicating that the USIM 1 UE 1*l*-02 prefers to cancel the leave and maintain the RRC connection mode, an LTS procedure may be started even when the prohibit timer is running. The prohibit timer value may be set to a value smaller than or equal to or smaller than a new timer value started for transition to an RRC idle mode without a response from the NW1. This is because, when the USIM 1 UE does not receive a response from the NW1, the USIM 1 UE can re-start an LTS procedure. In the present disclosure, the timer may be referred to as Tyyy.

In operation 1*l*-25, according to operations described with reference to FIG. 1F, the USIM 2 UE 1*l*-03 may determine that the USIM 1 UE 1*l*-02 releases RRC connection to the NW1 1*l*-04 in a particular STS-gap period, and thus, the USIM 2 UE 1*l*-03 has to transmit and receive data by configuring or resuming RRC connection to the NW2 1*l*-05. For example, in operation 1*l*-25, the USIM 2 UE 1*l*-03 may receive a paging (CN or RAN) message by monitoring a paging channel transmitted from the NW2 1*l*-05 during the particular STS-gap period. The paging message includes a USIM 2 UE identifier (ue-Identity) for identifying the USIM 2 UE 1*l*-03 and/or a cause value (e.g., paging cause indicating voice) for transmitting the paging message, such that the USIM 2 UE 1*l*-03 may determine to transmit and receive data, in response to the paging message transmitted from the NW2 1*l*-05.

In operation 1*l*-30, the USIM 2 UE 1*l*-03 may provide the USIM 1 UE 1*l*-02 with an indicator or an information element indicating that the USIM 2 UE 1*l*-03 desires the USIM 1 UE 1*l*-02 to release RRC connection to the NW1 1*l*-04 and attempts to transmit and receive data by configuring or resuming RRC connection to the NW2 1*l*-05. For example, the USIM 2 UE 1*l*-03 may transmit, to the USIM 1 UE 1*l*-02, information about indication of preference to perform an LTS procedure.

In operation 1*l*-35, the USIM 1 UE 1*l*-02 may transmit, to the NW1 1*l*-04, an RRC message or a NAS message including information indicating, for the USIM 2 UE 1*l*-03, preference to release an RRC connection mode with respect to the NW1 1*l*-04. The preset RRC message may indicate UEAssistanceInformation, a new RRC message, or the like, and the preset NAS message may indicate Registration Request, a Service Request message, ULInformationTransfer, or the like. The information indicating preference to release the RRC connection mode may indicate at least one of an indicator indicating preference to leave the RRC connection mode, a preferred RRC state (RRC_IDLE or RRC_INACTIVE or preference to RRC_CONNECTED), and paging restriction information. The information indicating preference to release the RRC connection mode may be included and transmitted only in the preset RRC message or may be included and transmitted only in the preset NAS message, or the preset NAS message may be included and transmitted in the preset RRC message. Obviously, in operation 1*l*-35, the USIM 1 UE 1*l*-02 may transmit a MAC CE to the NW1 1*l*-04. The MAC CE may indicate a MAC CE indicating preference to leave an RRC connection mode or a MAC CE indicating a preferred RRC state.

In operation 1*l*-31, the USIM 1 UE 1*l*-02 may start or restart a new timer Txxx with a new timer value started by the USIM 1 UE 1*l*-02 to transition to an RRC idle mode without a response from the NW1 described above in operation 1*l*-20, and in operation 1*l*-35, the preset RRC message, the NAS message, or the MAC CE may be transmitted to the NW1 1*l*-04.

Alternatively, the USIM 1 UE 1*l*-02 may start the new timer Txxx when the USIM 1 UE 1*l*-02 successfully transmits the preset RRC message, the NAS message, or the MAC CE (when an RRC layer receives acknowledgement of success in reception of the message from an RLC or PDCP or MAC layer).

In operation 1*l*-31, the USIM 1 UE 1*l*-02 may start the aforementioned new timer Tyyy.

In operation 1*l*-40, the USIM 1 UE 1*l*-02 may transmit, to the NW1 1*l*-04, a preset RRC message or a NAS message or an MAC CE including information indicating preference to maintain the RRC connection mode with respect to the NW1 1*l*-04. That is, the USIM 1 UE 1*l*-02 may perform operation 1*l*-40 when the USIM 1 UE 1*l*-02 prefers to cancel operation 1*l*-35. Operation 1*l*-40 may be performed when new timer Tyyy expires or while Tyyy is running. Alternatively, operation 1*l*-40 may be performed when the indicator is configured in operation 1*l*-20, wherein, by the indicator, the USIM 1 UE 1*l*-02 is enabled to transmit a message indicating that the USIM 1 UE 1*l*-02 prefers to cancel the leave and maintain the RRC connection mode although the USIM 1 UE 1*l*-02 has transmitted a preset RRC message, a NAS message, or an MAC CE so as to leave the RRC connection mode. The preset RRC message or the NAS message or the MAC CE may include an indicator or information element indicating an RRC connection mode.

Figure 1M:
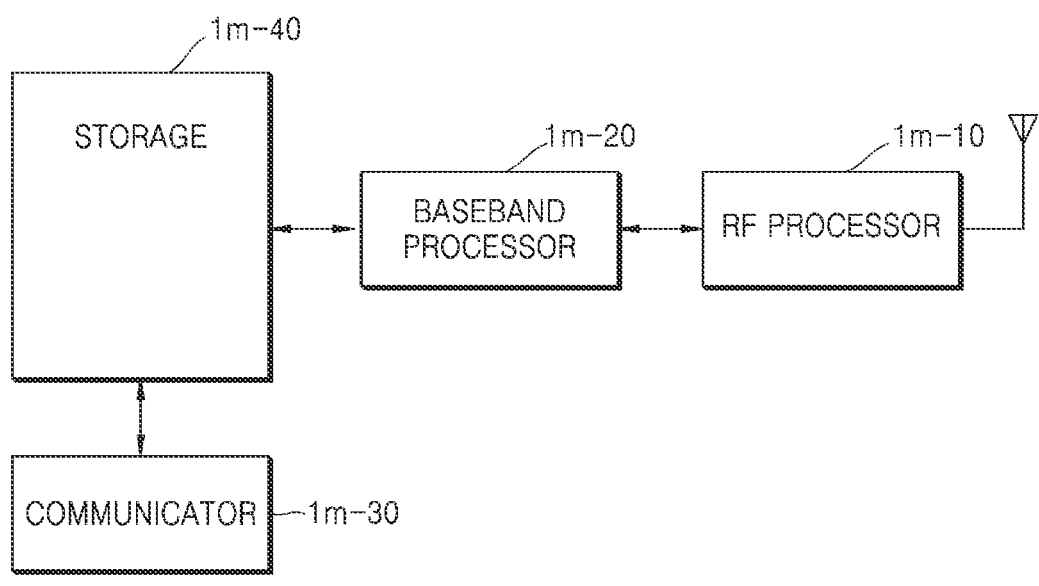
FIG. 1M is a block diagram illustrating an inner configuration of a UE according to an embodiment of the present disclosure.

FIG. 1M is a block diagram illustrating an inner configuration of a UE according to an embodiment of the present disclosure.

Referring to the drawing, the UE may include a radio frequency (RF) processor 1*m*-10, a baseband processor 1*m*-20, a storage 1*m*-30, and a controller 1*m*-40.

The RF processor 1*m*-10 performs functions for transmitting and receiving signals via wireless channels, e.g., band conversion and amplification of the signals. That is, the RF processor 1*m*-10 up-converts a baseband signal provided from the baseband processor 1*m*-20, into an RF band signal and then transmits the RF band signal through an antenna, and down-converts an RF band signal received through the antenna, into a baseband signal. For example, the RF processor 1*m*-10 may include a transmit filter, a receive filter, an amplifier, a mixer, an oscillator, a digital-to-analog convertor (DAC), an analog-to-digital convertor (ADC), or the like. Although only one antenna is illustrated in the drawing, the UE may include a plurality of antennas. Also, the RF processor 1*m*-10 may include a plurality of RF chains. Furthermore, the RF processor 1*m*-10 may perform beamforming. For the beamforming, the RF processor 1*m*-10 may adjust phases and intensities of respective signals that are transmitted or received through a plurality of antennas or antenna elements. Also, the RF processor may perform MIMO, and may receive a plurality of layers when performing an MIMO operation.

The baseband processor 1m-20 performs conversion between a baseband signal and a bit string based on physical layer specifications of a system. For example, for data transmission, the baseband processor 1m-20 generates complex symbols by encoding and modulating a transmit bit string. For data reception, the baseband processor 1m-20 reconstructs a received bit string by demodulating and decoding a baseband signal provided from the RF processor 1m-10. For example, according to an OFDM scheme, for data transmission, the baseband processor 1m-20 generates complex symbols by encoding and modulating a transmit bit string, maps the complex symbols to subcarriers, and then configures OFDM symbols by performing inverse fast Fourier transformation (IFFT) and inserting a cyclic prefix (CP). For data reception, the baseband processor 1m-20 segments a baseband signal provided from the RF processor 1m-10, into OFDM symbol units, reconstructs signals mapped to subcarriers by performing fast Fourier transformation (FFT) calculation, and then reconstructs a received bit string by demodulating and decoding the signals.

The baseband processor 1m-20 and the RF processor 1m-10 transmit and receive signals in a manner described above. Accordingly, the baseband processor 1m-20 and the RF processor 1m-10 may also be called a transmitter, a receiver, a transceiver, or a communicator. Furthermore, at least one of the baseband processor 1m-20 and the RF processor 1m-10 may include different communication modules to support different radio access technologies. Also, at least one of the baseband processor 1m-20 and the RF processor 1m-10 may include different communication modules to process signals of different frequency bands. For example, the different radio access technologies may include a wireless LAN (e.g.,: IEEE 802.11), a cellular network (e.g.,: LTE), or the like. The different frequency bands may include a super-high frequency (SHF) (e.g., 2. NRHz, NRhz) band and a millimeter wave (mmWave) (e.g., 60 GHz) band.

The storage 1m-30 stores basic programs, application programs, and data, e.g., configuration information, for operations of the UE. In particular, the storage 1m-30 may store information associated with a second access node that performs wireless communication by using a second radio access technology. The storage 1m-30 provides the stored data in response to a request by the controller 1m-40.

The controller 1m-40 controls overall operations of the UE. For example, the controller 1m-40 transmits and receives signals via the baseband processor 1m-20 and the RF processor 1m-10. Also, the controller 1m-40 records and reads data on or from the storage 1m-40. To this end, the controller 1m-40 may include at least one processor. For example, the controller 1m-40 may include a communication processor (CP) for controlling communications and an application processor (AP) for controlling a higher layer such as an application program.

Figure 1N:
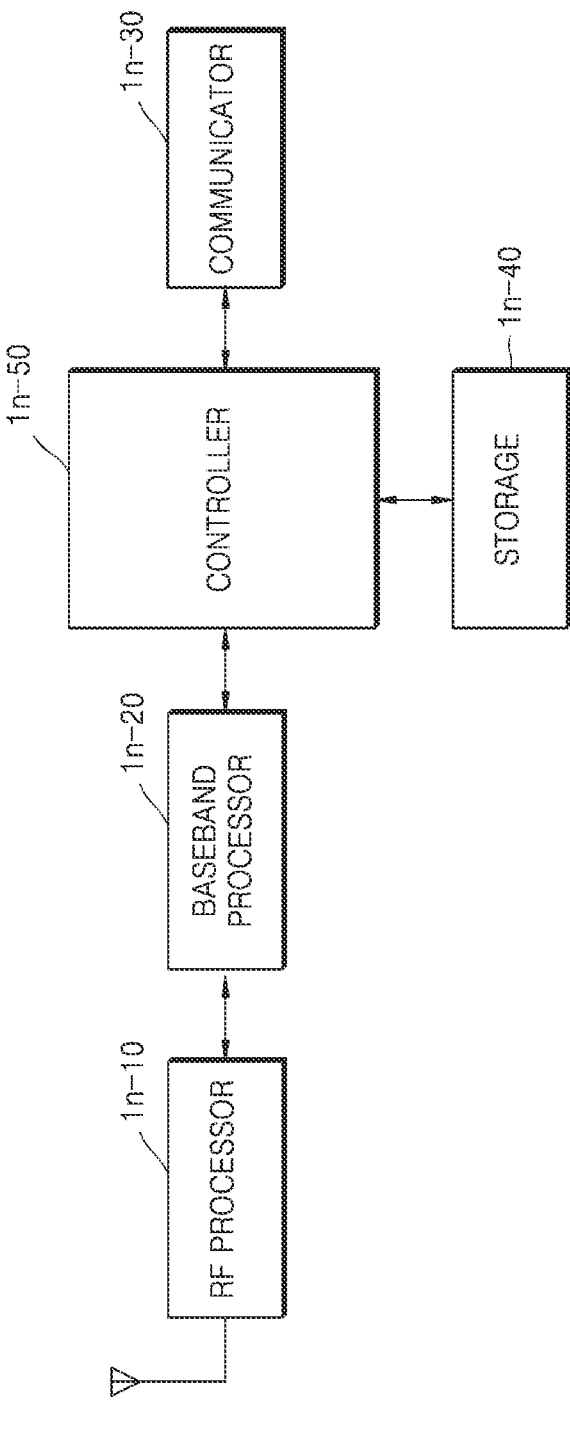
FIG. 1N is a block diagram illustrating a configuration of a new radio (NR) BS according to an embodiment of the present disclosure.

FIG. 1N is a block diagram illustrating a configuration of an NR BS according to an embodiment of the present disclosure.

As illustrated in the drawing, the BS includes an RF processor 1n-10, a baseband processor 1n-20, a backhaul communicator 1n-30, a storage 1n-40, and a controller 1n-50.

The RF processor 1n-10 performs functions for transmitting and receiving signals via wireless channels, e.g., band conversion and amplification of the signals. That is, the RF processor 1n-10 up-converts a baseband signal provided from the baseband processor 1n-20, into an RF band signal and then transmits the RF band signal through an antenna, and down-converts an RF band signal received through the antenna, into a baseband signal. For example, the RF processor 1n-10 may include a transmit filter, a receive filter, an amplifier, a mixer, an oscillator, a DAC, an ADC, or the like. Although only one antenna is illustrated in the drawing, the first access node may include a plurality of antennas. Also, the RF processor 1n-10 may include a plurality of RF chains. Furthermore, the RF processor 1n-10 may perform beamforming. For the beamforming, the RF processor 1n-10 may adjust phases and intensities of respective signals that are transmitted or received via a plurality of antennas or antenna elements. The RF processor may perform a DL MIMO operation by transmitting one or more layers.

The baseband processor 1n-20 converts between a baseband signal and a bit string according to physical layer specifications of a first radio access technology. For example, for data transmission, the baseband processor 1n-20 generates complex symbols by encoding and modulating a transmit bit string. For data reception, the baseband processor 1n-20 reconstructs a received bit string by demodulating and decoding a baseband signal provided from the RF processor 1n-10. For example, according to an OFDM scheme, for data transmission, the baseband processor 1n-20 generates complex symbols by encoding and modulating a transmit bit string, maps the complex symbols to subcarriers, and then configures OFDM symbols by performing IFFT and inserting a cyclic prefix (CP). For data reception, the baseband processor 1n-20 segments a baseband signal provided from the RF processor 1n-10, into OFDM symbol units, reconstructs signals mapped to subcarriers by performing FFT calculation, and then reconstructs a received bit string by demodulating and decoding the signals. The baseband processor 1n-20 and the RF processor 1n-10 transmits and receives signals in a manner described above. Accordingly, the baseband processor 1n-20 and the RF processor 1n-10 may also be called a transmitter, a receiver, a transceiver, a communicator, or a wireless communicator.

The backhaul communicator 1n-30 provides an interface for performing communication with other nodes in a network. That is, the backhaul communicator 1n-30 converts a bit string into a physical signal, the bit string being transmitted from a primary BS to another node, e.g., an auxiliary BS, a core network, etc., and converts a physical signal into a bit string, the physical signal being received from the other node.

The storage 1n-40 stores basic programs, application programs, and data, e.g., configuration information, for operations of the primary BS. The storage 1n-40 may store information about a bearer allocated to the accessing UE, a measurement result reported from the accessing UE, and the like. Also, the storage 1n-40 may store information that is a reference as to whether to provide or stop multi-connection to the UE. The storage 1n-40 provides the stored data in response to a request by the controller 1n-50.

The controller 1n-50 controls overall operations of the primary BS. For example, the controller 1n-50 transmits and receives signals via the baseband processor 1n-20 and the RF processor 1n-10 or the backhaul communicator 1n-30. Also, the controller 1n-50 records and reads data on or from the storage 1n-40. To this end, the controller 1n-50 may include at least one processor.

According to an embodiment of the present disclosure, a method performed by a UE in a wireless communication system may be provided. The method may include: receiving, from a BS, configuration information associated with the UE leaving a radio resource control (RRC) connection state so as to perform a multi-universal subscriber identity module (MUSIM) operation; based on the configuration information, transmitting, to the BS, information indicating an RRC state preferred when the UE leaves the RRC connection state, and starting a timer; and transitioning to an RRC idle state when the timer expires.

According to an embodiment, the method may further include stopping the timer when an RRC connection release message is received from the BS while the timer is running.

According to an embodiment, the method may further include starting an RRC connection re-establishment procedure while the timer is running.

According to an embodiment, the method may further include releasing the configuration information, based on the starting of the RRC connection re-establishment procedure.

According to an embodiment, the method may further include stopping the timer, based on the starting of the RRC connection re-establishment procedure.

According to an embodiment, the information indicating the preferred RRC state may be transmitted via a UE assistance information message to the BS.

According to an embodiment, the configuration information may be received from the BS via an RRC reconfiguration message including an otherConfig information element.

According to an embodiment, the preferred RRC state may include the RRC idle state or an RRC inactive state.

According to an embodiment of the present disclosure, a UE in a wireless communication system may be provided. The UE may include: a transceiver; and at least one processor configured to receive, from a BS via the transceiver, configuration information associated with the UE leaving a radio resource control (RRC) connection state so as to perform a multi-universal subscriber identity module (MUSIM) operation, based on the configuration information, transmit, to the BS via the transceiver, information indicating an RRC state preferred when the UE leaves the RRC connection state, and start a timer, and transition to an RRC idle state when the timer expires.

According to an embodiment, the at least one processor may be configured to stop the timer when an RRC connection release message is received from the BS while the timer is running.

According to an embodiment, the at least one processor may be configured to start an RRC connection re-establishment procedure while the timer is running.

According to an embodiment, the at least one processor may be configured to release the configuration information, based on the starting of the RRC connection re-establishment procedure.

According to an embodiment, the at least one processor may be configured to stop the timer, based on the starting of the RRC connection re-establishment procedure.

According to an embodiment, the information indicating the preferred RRC state may be transmitted via a UE assistance information message to the BS.

According to an embodiment, the configuration information may be received from the BS via an RRC reconfiguration message including an otherConfig information element.

Figure 2:
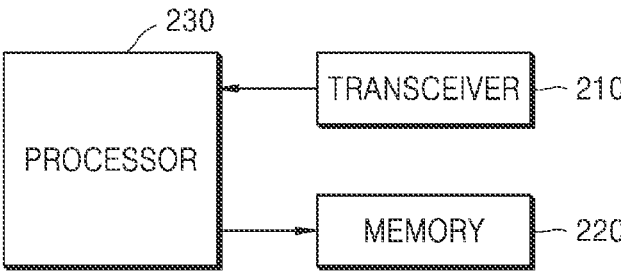
FIG. 2 is a diagram illustrating a configuration of a UE according to an embodiment of the present disclosure.

FIG. 2 is a diagram illustrating a configuration of a UE according to an embodiment of the present disclosure.

As illustrated in FIG. 2, the UE of the present disclosure may include a transceiver 210, a memory 220, and a processor 230. According to the communication method of the UE, the processor 230, the transceiver 210 and the memory 220 of the UE may operate. However, the elements of the UE are not limited thereto. For example, the UE may include more elements or fewer elements than the elements described above. Furthermore, the processor 230, the transceiver 210 and the memory 220 may be implemented as one chip.

The transceiver 210 is a collective term of a receiver of the UE and a transmitter of the UE, and may transmit or receive a signal to or from a BS or a network entity. The signal transmitted to or received from the BS may include control information and data. To this end, the transceiver 210 may include an RF transmitter for up-converting and amplifying a frequency of a signal to be transmitted, and an RF receiver for low-noise amplifying and down-converting a frequency of a received signal. However, this is merely an example of the transceiver 210, and elements of the transceiver 210 are not limited to the RF transmitter and the RF receiver.

Also, the transceiver 210 may include a wired or wireless transceiver, and may include various configurations for transmitting and receiving signals.

Also, the transceiver 210 may receive signals via wired or wireless channels and output the signals to the processor 230, and may transmit signals output from the processor 230, via wired or wireless channels.

Also, the transceiver 210 may receive communication signals and output the communication signals to the processor, and may transmit signals output from the processor, to the network entity via a wireless or wired network.

The memory 220 may store programs and data required to operate the UE. Also, the memory 220 may store control information or data included in a signal obtained by the UE. The memory 220 may include any or a combination of storage media such as read only memory (ROM), random access memory (RAM), a hard disk, a compact disc (CD)-ROM, and a digital versatile disc (DVD).

The processor 230 may control a series of processes so that the UE operates according to the embodiments of the present disclosure. The processor 230 may include at least one processor. For example, the processor 230 may include a CP for controlling communications and an AP for controlling a higher layer such as an application program.

Figure 3:
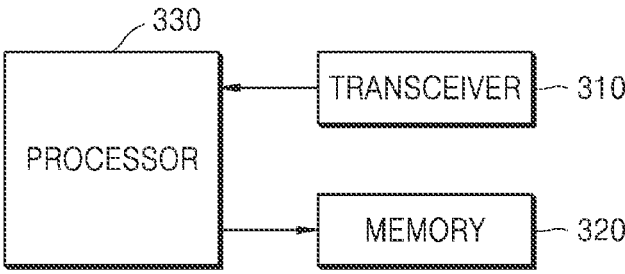
FIG. 3 is a diagram illustrating a configuration of a BS according to an embodiment of the present disclosure.

FIG. 3 is a diagram illustrating a configuration of a BS according to an embodiment of the present disclosure.

As illustrated in FIG. 3, the BS of the present disclosure may include a transceiver 310, a memory 320, and a processor 330. According to the communication method of the BS, the processor 330, the transceiver 310 and the memory 320 of the BS may operate. However, the elements of the BS are not limited thereto. For example, the BS may include more elements or fewer elements than the elements described above. Furthermore, the processor 330, the transceiver 310 and the memory 320 may be implemented as one chip.

The transceiver 310 is a collective term of a receiver of the BS and a transmitter of the BS, and may transmit or receive a signal to or from a UE or another BS. The signal being transmitted or received may include control information and data. To this end, the transceiver 310 may include an RF transmitter for up-converting and amplifying a frequency of a signal to be transmitted, and an RF receiver for low-noise amplifying and down-converting a frequency of a received signal. However, this is merely an example of the transceiver 310, and elements of the transceiver 310 are not limited to the RF transmitter and the RF receiver. Also, the transceiver 310 may include a wired or wireless transceiver, and may include various configurations for transmitting and receiving signals.

Also, the transceiver 310 may receive signals via communication signals (e.g., wireless channels) and output the signals to the processor 330, and may transmit signals output from the processor 330, via communication channels.

Also, the transceiver 310 may receive communication signals and output the communication signals to the processor, and may transmit signals output from the processor, to a UE or a network entity via a wireless or wired network.

The memory 320 may store programs and data required to operate the BS. Also, the memory 320 may store control information or data included in a signal obtained by the BS. The memory 320 may include any or a combination of storage media such as ROM, RAM, a hard disk, a CD-ROM, and a DVD.

The processor 330 may control a series of processes to allow the BS to operate according to the aforementioned embodiments of the present disclosure. The processor 330 may include at least one processor. The methods according to the embodiments of the present disclosure as described in claims or specification may be implemented as hardware, software, or a combination of hardware and software.

The methods according to the embodiments of the present disclosure as described in claims or specification may be implemented as hardware, software, or a combination of hardware and software.

When implemented as software, a computer-readable storage medium which stores one or more programs (e.g., software modules) may be provided. The one or more programs stored in the computer-readable storage medium are configured for execution by one or more processors in an electronic device. The one or more programs include instructions directing the electronic device to execute the methods according to the embodiments of the present disclosure as described in the claims or the specification.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible via any or a combination of communication networks such as Internet, an intranet, a local area network (LAN), a wide LAN (WLAN), a storage area network (SAN), or the like. Such a storage device may access, via an external port, a device performing the embodiments of the present disclosure. Furthermore, a separate storage device on the communication network may access the electronic device performing the embodiments of the present disclosure.

In the afore-described embodiments of the present disclosure, elements included in the present disclosure are expressed in a singular or plural form according to the embodiments of the present disclosure. However, the singular or plural form is appropriately selected for convenience of descriptions and the present disclosure is not limited thereto. As such, an element expressed in a plural form may also be configured as a single element, and an element expressed in a singular form may also be configured as plural elements.

Specific embodiments of the present disclosure are described in the descriptions of the present disclosure, but it will be understood that various modifications may be made without departing the scope of the present disclosure. Thus, the scope of the present disclosure is not limited to the embodiments described herein and should be defined by the appended claims and their equivalents. That is, it will be apparent to one of ordinary skill in the art that other modifications based on the technical ideas of the present disclosure are feasible. Also, the embodiments may be combined to be implemented, when required. For example, portions of the methods provided by the present disclosure may be combined with each other to enable the BS and the UE to operate. Also, although the embodiments are described based on 5G and NR systems, modifications based on the technical scope of the embodiments may be applied to other communication systems such as LTE, LTE-A, LTE-A-Pro systems, or the like.

The invention claimed is:

1. A method performed by a user equipment (UE) in a wireless communication system, the method comprising:
    receiving, from a base station, a first radio resource control (RRC) reconfiguration message including configuration information associated with the UE to leave an RRC connection state for a multi-universal subscriber identity module (MUSIM) operation, wherein the configuration information includes information associated with a timer for entering an RRC idle state without a response;
    in case that the UE needs to leave the RRC connection state, starting the timer;
    receiving, from the base station, a second RRC reconfiguration message; and
    in case that the timer is running, stopping the timer, upon reception of the second RRC reconfiguration message.

2. The method of claim 1, further comprising in case that the UE needs to leave the RRC connection state, transmitting, to the base station, UE assistance information associated with a preference to leave the RRC connection state.

3. The method of claim 2, wherein the UE assistance information includes information indicating a preferred RRC state when leaving the RRC connection state, and
    wherein the preferred RRC state includes the RRC idle state or an RRC inactive state.

4. The method of claim 2, wherein the UE assistance information includes information indicating the preference to leave the RRC connection state.

5. The method of claim 1, wherein the timer is started with a timer value set to the information associated with the timer.

6. The method of claim 1, wherein based the second RRC reconfiguration message, the configuration information is released.

7. The method of claim 1, further comprising in case that the timer is running, stopping the timer, based on an RRC connection release message received from the base station.

8. A method performed by a base station in a wireless communication system, the method comprising:
    transmitting, to a user equipment (UE), a first radio resource control (RRC) reconfiguration message including configuration information associated with the UE to leave a radio resource control (RRC) connection state for a multi-universal subscriber identity module (MUSIM) operation, the configuration information including information associated with a timer for the UE to enter an RRC idle state without a response; and transmitting, to the UE, a second RRC reconfiguration message, wherein the second RRC reconfiguration message is associated with stopping the timer.

9. The method of claim 8, further comprising receiving, from the UE, UE assistance information associated with a preference to leave the RRC connection state, in case that the UE needs to leave the RRC connection state, wherein the UE assistance information includes information indicating a preferred RRC state when leaving the RRC connection state or information indicating the preference to leave the RRC connection state, and wherein the preferred RRC state includes the RRC idle state or an RRC inactive state.

10. The method of claim 8, wherein the timer is started with a timer value set to the information associated with the timer.

11. The method of claim 8, wherein the second RRC reconfiguration message is associated with release of the configuration information.

12. The method of claim 8, further comprising transmitting, to the UE, an RRC connection release message associated with stopping of the timer.

13. A user equipment (UE) in a wireless communication system, the UE comprising:

at least one transceiver;

at least one processor communicatively coupled to the at least one transceiver; and at least one memory, communicatively coupled to the at least one processor, storing instructions executable by the at least one processor to cause the UE to:

receive, from a base station, a first radio resource control (RRC) reconfiguration message including configuration information associated with the UE to leave an RRC connection state for a multi-universal subscriber identity module (MUSIM) operation, wherein the configuration information includes information associated with a timer for entering an RRC idle state without a response, in case that the UE needs to leave the RRC connection state, start the timer, receive, from the base station, a second RRC reconfiguration message, and in case that the timer is running, stop the timer, upon reception of the second RRC reconfiguration message.

14. The UE of claim 13, wherein the UE is further caused to:

in case that the UE needs to leave the RRC connection state, transmit, to the base station, UE assistance information associated with a preference to leave the RRC connection state.

15. The UE of claim 14, wherein the UE assistance information includes information indicating a preferred RRC state when leaving the RRC connection state, and wherein the preferred RRC state includes the RRC idle state or an RRC inactive state.

16. The UE of claim 14, wherein the UE assistance information includes information indicating the preference to leave the RRC connection state.

17. The UE of claim 13, wherein based on the second RRC reconfiguration message, the configuration information is released.

18. A base station in a wireless communication system, the base station comprising:

at least one transceiver;

at least one processor communicatively coupled to the at least one transceiver; and at least one memory, communicatively coupled to the at least one processor, storing instructions executable by the at least one processor to cause the base station to:

transmit, to a user equipment (UE), a first radio resource control (RRC) reconfiguration message including configuration information associated with the UE to leave a radio resource control (RRC) connection state for a multi-universal subscriber identity module (MUSIM) operation, the configuration information including information associated with a timer for the UE to enter an RRC idle state without a response; and transmit, to the UE, a second RRC reconfiguration message, wherein the second RRC reconfiguration message is associated with stopping the timer.

19. The base station of claim 18, wherein the base station is further caused to:

receive, from the UE, UE assistance information associated with a preference to leave the RRC connection state, in case that the UE needs to leave the RRC connection state, wherein the UE assistance information includes information indicating a preferred RRC state when leaving the RRC connection state or information indicating the preference to leave the RRC connection state, and wherein the preferred RRC state includes the RRC idle state or an RRC inactive state.

20. The base station of claim 18, wherein the second RRC reconfiguration message is associated with release of the configuration information.

* * * * *